United States Patent
Pinard

(10) Patent No.: US 11,587,000 B2
(45) Date of Patent: Feb. 21, 2023

(54) WORKFORCE RESPONSE BASED EVENT MANAGEMENT METHODS AND SYSTEMS

(71) Applicant: INITLIVE INC., Kanata (CA)

(72) Inventor: Melissa Michele Pinard, Kanata (CA)

(73) Assignee: InitLive Inc., Ottawa (CA)

( * ) Notice: Subject to any disclaimer, the term of this patent is extended or adjusted under 35 U.S.C. 154(b) by 95 days.

(21) Appl. No.: 16/291,155

(22) Filed: Mar. 4, 2019

(65) Prior Publication Data
US 2019/0272312 A1 Sep. 5, 2019

Related U.S. Application Data

(60) Provisional application No. 62/637,580, filed on Mar. 2, 2018.

(51) Int. Cl.
| | |
|---|---|
| G06Q 10/06 | (2012.01) |
| G06Q 10/0631 | (2023.01) |
| H04L 67/306 | (2022.01) |
| G06F 40/174 | (2020.01) |
| G06F 40/221 | (2020.01) |

(52) U.S. Cl.
CPC .......... *G06Q 10/063112* (2013.01); *G06F 40/174* (2020.01); *G06F 40/221* (2020.01); *H04L 67/306* (2013.01)

(58) Field of Classification Search
None
See application file for complete search history.

(56) References Cited

U.S. PATENT DOCUMENTS

| | | | | |
|---|---|---|---|---|
| 2008/0027783 A1* | 1/2008 | Hughes | ............ | G06Q 10/06398 705/7.14 |
| 2011/0313805 A1* | 12/2011 | Heydemann | ..... | G06Q 10/06316 705/7.14 |
| 2018/0365628 A1* | 12/2018 | Bhaskaran | ..... | G06Q 10/063112 |

* cited by examiner

*Primary Examiner* — Cory W Eskridge
(74) *Attorney, Agent, or Firm* — Rosenberg, Klein & Lee

(57) ABSTRACT

Event organizers must assign volunteers, staff, sub-contractors etc. over multiple roles, multiple shifts, and multiple locations. Assigning individuals, whether a few to hundreds or thousands, requires the user to filter through registration information and align this to the roles/shifts etc. This is further complicated when the registration forms used to acquire user data are custom questionnaires. Embodiments of the invention automatically generates custom filters for subsequently filtering of the entries made by registrants where the user generates custom questions. Further, embodiments of the invention allow the importation of data from other sources wherein if it includes fields not supported by the database into which the data is being imported the system automatically adds new custom fields to the database as well as supporting the establishment of new questionnaires, new custom filters, and triggering registration updates from existing registrants to acquire new data for the new custom fields.

20 Claims, 20 Drawing Sheets

WORKFORCE RESPONSE BASED EVENT MANAGEMENT METHODS AND SYSTEMS

CROSS-REFERENCE TO RELATED APPLICATIONS

This patent application claims priority from U.S. Provisional Patent Application 62/637,580 filed Mar. 2, 2018 entitled "Creating Filters for Lists based on Custom Questions and Answers and Taking Action", the entire contents of which are incorporated herein by reference.

FIELD OF THE INVENTION

This patent application relates to the field of resource management, and more particularly to methods and systems for managing volunteers, employees and other individuals associated with a task, shift, or other activity within a planned event. These methods and systems automatically establishing custom filters for event staff to employ in dependence upon custom questionnaires generated for and completed by volunteers, employees and other individuals.

BACKGROUND OF THE INVENTION

There are a wide range of instances where a group of individuals are coordinated for an event. Examples of such events can include, but are not limited to, sporting events, convocations, festivals, concerts, business meetings, conferences, charity events, and reunions. Today, in order to set up such events a range of options exist with respect to communication tools including, for example, Simple Messaging Service (SMS), telephone, social media such as Facebook™, messaging services such as Twitter™, email, and web based services such as Google Events.

The number of helpers, volunteers, attendees, support staff, event staff etc. may range from a few to hundreds to thousands. At the same time the number of roles associated with an event may range from only a couple to tens or potentially hundreds whilst the events themselves may be associated with a single location or multiple locations, a single activity or multiple activities, a short period of time or an extended period of time, a single occurrence or multiple repeating occurrences. Accordingly, for organizers of such events the assignment of personnel can be a highly time consuming, arduous, and difficult task.

This is further complicated through the immense diversity of skill requirements for events even within the same class of event etc. as well as the scope of other information that may be appropriate relating either to the event, the roles, and individuals. Accordingly, in recruiting and registering helpers, volunteers, attendees, support staff, event staff etc. there are many instances where custom questions need to be asked in order to determine who the best candidates are, how they fit into the various roles, and when they are able to work etc. Within prior art registration systems, these questions are created using a specific registration tool or general administration tools such as Google Forms. Typically, a person registers with the system, enters their answers to the questions etc. wherein these answers to their questions are then exported into a file format such as Microsoft™ Word or Microsoft™ Excel for example. These questions are then used to schedule people into roles and shifts manually by working off the files either upon a display of an electronic device or from printed copies of the files. Where the number of users, the number of roles, etc. increases then this becomes increasingly difficult, time consuming, etc. and fraught with errors.

However, it would be beneficial for event organizers to be able to create a custom questionnaire comprising one or more custom questions associated with their event in order to obtain specific information relating to the registering helpers, volunteers, attendees, support staff, event staff etc. It would be further beneficial for systems providing organizers with event management capabilities which support the generation of the one or more custom questions to automatically generate custom filters for subsequently filtering of the entries made by the registering helpers, volunteers, attendees, support staff, event staff etc.

Further, in other instances where data is being migrated to a new software platform or where data is being merged from previous events, other parts of an organization, other organizations etc. then it would be beneficial to provide system features that allow the importation of this data. Further, where the data being imported includes fields not supported by the database into which the data is being imported for the system to provide integration features allowing new custom fields to be generated within the database as well as for the establishment of new questionnaires and new custom filters allowing the data related to the new custom fields to be filtered and established in respect of other users already existing within the database within which the data is being migrated into.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to field of resource management, and more particularly to methods and systems for managing volunteers, employees and other individuals associated with a task, shift, or other activity within a planned event. These methods and systems automatically establishing custom filters for event staff to employ in dependence upon custom questionnaires generated for and completed by volunteers, employees and other individuals.

In accordance with an embodiment of the invention there is provided a system comprising a first electronic device comprising a first microprocessor, a first memory for storing first executable instructions, and a first network interface for interfacing to a communications network, wherein the first executable instructions when executed by the first microprocessor configure the server to:
  receive from a second electronic device via the first network interface a first identifier, the first identifier relating of a source of data stored upon a first remote storage accessible to the first electronic device;
  receive from the second electronic device via the first network interface a second identifier, the second identifier relating of a database stored upon a second remote storage accessible to the first electronic device;
  access the source of data;
  parse the source of data to identify a plurality of headers within the data stored within the source of data;
  for each header of the plurality of headers determining whether the header is present within the database or not;

upon determining the header is not present within the database the first electronic device is further configured to:

create a new field within the database associated with the header;

create a new question for a first software application allowing registrants upon other electronic devices to register for one or more events;

create a filter for a second software application which can access the database allowing a user of the second software application to filter entries within the database;

establish first options for the filter when presented to the user within the second software application; and establish second options for the new question when presented to a registrant using the first software application.

In accordance with an embodiment of the invention there is provided a system comprising a first electronic device comprising a first microprocessor, a first memory for storing first executable instructions, and a first network interface for interfacing to a communications network, wherein the first executable instructions when executed by the first microprocessor configure the first electronic device to:

present to a user of the electronic device a first graphical user interface (GUI) enabling the user to generate a new question for a questionnaire to be presented to other users seeking to register for one or more events;

receive from the user one or more first inputs via the first user interface from which the first electronic device establishes content of the new question to be rendered to other users;

receive from the user one or more second inputs via the first user interface from which the first electronic device establishes a format of an answer to the new question to be rendered to other users;

transmit the content of the new question to a second electronic device; and transmit the format of the answer to the new question to the second electronic device; and a second electronic device comprising a second microprocessor, a second memory for storing first executable instructions, and a second network interface for interfacing to a communications network, wherein the second executable instructions when executed by the first microprocessor configure the second electronic device to:

receive the content of the new question from the first electronic device;

receive the format of the answer to the new question from the second electronic device;

store the content of the new question within a database stored within a third memory accessible to the second electronic device;

store the format of the answer to the new question within the database stored within the third memory accessible to the second electronic device;

automatically generate in dependence upon the content of the new question and format of the answer to the new question a first custom filter; and store the first custom filter within a fourth memory accessible to the second electronic device;

wherein the first custom filter may be subsequently employed to filter registrants who have completed the questionnaire in dependence upon their answers to the new question.

In accordance with an embodiment of the invention there is provided a system comprising a first electronic device server comprising a first microprocessor, a first memory for storing first executable instructions, and a first network interface for interfacing to a communications network, wherein the first executable instructions when executed by the first microprocessor configure the server to:

receive from a second electronic device via the first network interface a first identifier relating of an event;

receive from the second electronic device via the first network interface a plurality of second identifiers, each second identifier of the plurality of second identifiers relating to a role to be associated with the event;

receive from the second electronic device via the first network interface a plurality of third identifiers, each third identifier of the plurality of third identifiers relating to a requirement associated with a role which is associated with the event;

receive from the second electronic device via the first network interface a plurality of fourth identifiers, each fourth identifier of the plurality of fourth identifiers relating to a shift associated with a role which is associated with the event;

access a database stored within a second memory accessible to the first electronic device, the database storing questionnaire responses from a plurality of registrants generated by each registrant in response to being presented a questionnaire;

parse the questionnaire responses for the plurality of registrants against the plurality of third identifiers;

determine whether the questionnaire responses for a registrant of the plurality of registrants match one or more of the plurality of third identifiers; and upon determining a match automatically associating the registrant of the plurality of registrants with the role having the one or more of the plurality of third identifiers.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 6 depicts an exemplary GUI presented to a user by an EMSSAP according to an embodiment of the invention indicating users together with options to select filters and/or actions to be performed;

FIG. 7A depicts an exemplary GUI presented to a user by an EMSSAP according to an embodiment of the invention upon selection of filter options;

FIG. 7B depicts exemplary GUIs presented to a registering user by an EMSSAP according to an embodiment of the invention relating to different question filters established in dependence upon the type of answer selected by a user generating the question;

DETAILED DESCRIPTION

Figure 1:
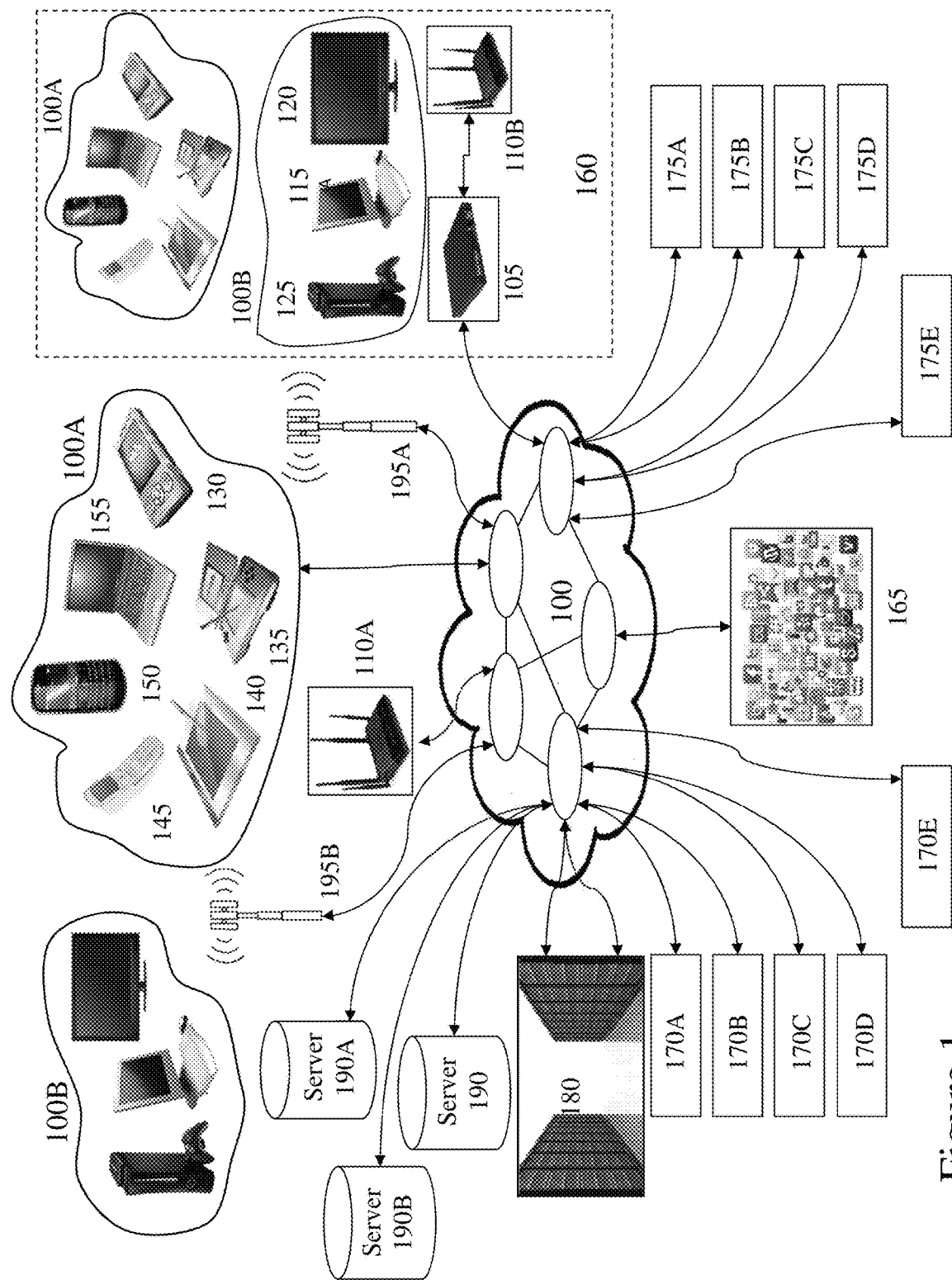
FIG. 1 depicts a network environment supporting embodiments of the invention.

The present description is directed to field of resource management, and more particularly to methods and systems for managing volunteers, employees and other individuals associated with a task, shift, or other activity within a planned event. These methods and systems automatically establishing custom filters for event staff to employ in dependence upon custom questionnaires generated for and completed by volunteers, employees and other individuals.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims.

Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more software as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

An "event" as used herein, and throughout this disclosure, refers to an occurrence at one or more locations over one or more time periods involving one or more individuals with respect to one or more specific activities. Events may include, but not be limited, ceremonies of ritual or historical significance performed on special occasions, conventions or meetings of individuals with respect to a common interest, a festival, an artistic performance, a media event, a party, a social event, a recreational event, a corporate event, a sporting event. However, an event, within the context of managing and scheduling individuals, may also relate to, but not be limited to, events such as providing temporary staff to an organization or enterprise, providing permanent staff to an organization or enterprise, organizing individuals with respect to an emergency, organizing individuals for political campaigns, and organizing individuals for travel.

A "role" as used herein, and throughout this disclosure, refers to a function or position to be assumed by an individual with respect to an event.

Now referring to FIG. 1 there is depicted a network environment 100 within which embodiments of the invention may be employed event management software, systems, applications, and platforms (EMSSAPs) according to embodiments of the invention. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160 within which other first and second user groups 100A and 100B are disposed. Enterprise 160 may be an individual, organization or enterprise associated with the management of events directly or associated with the provisioning of personnel to events for a third-party. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are:
Social Networks (SOCNETS) 165 providing access to social media profiles, posted electronic content, posted file(s), etc.;
First remote system 170A, such as associated, for example, with an Original Equipment Manufacturer (OEM) or manufacturer providing or requiring one or more event management functions accessible to a user from their PED and/or FED;
Second remote system 170B, such as associated, for example, with an online software application accessed by a user from their PED and/or FED through a web browser interface hosting remote files for example;

Third remote system 170C, such as associated, for example, with a retailer and/or online retailer providing or requiring one or more event management functions accessible to a user from their PED and/or FED;

Fourth remote system 170D, such as associated, for example, with a provider of cloud storage providing or requiring one or more event management functions accessible to a user from their PED and/or FED;

Fifth remote system 170E, such as associated, for example, with a provider of a file conversion services, such as translation, format conversion, etc. which are stored remotely for subsequent access by a user;

First website 175A, such as associated, for example, with an online repository of files and/or electronic content such as Wikipedia™, Google™ Scholar, ResearchGate™, etc.;

Second website 175B, such as associated, for example, with an online repository for electronic content such as YouTube™, Vimeo™, MusicBrainz™, etc.;

First third ($3^{rd}$) party provider 175C, such as associated, for example, with an online repository of user specific data such as Microsoft™ OneDrive etc.;

Second 3rd party provider 175D, such as associated, for example, with an online repository of files such as Mega™, Dropbox™, Google Drive™ allowing users to upload content and provide access and/or shareable links to the uploaded content;

Third 3rd party provider 175E, such as associated with an enterprise being an employer and/or client of a user providing one or more shared drives/repositories for files accessible to the user with provisioning of the appropriate credentials (where required);

First to third servers 190A to 190C respectively which together with others, not shown for clarity which provide storage for files accessible to the user either directly or indirectly from one or more of the first to fifth remote systems 170A to 170E respectively and/or one of first and second websites 175A and 175B, first to third 3rd party providers 175C to 175E respectively.

Accordingly, a user employing one or more EMSSAPs may interact with one or more such providers, enterprises, service providers, retailers, third parties etc. and other users. First and second servers 190A and 190B may host according to embodiments of the inventions multiple services associated with a provider of software, systems, applications, and platforms (EMSSAPs); a provider of a SOCNET or Social Media (SOME) exploiting EMSSAP features; a provider of a SOCNET and/or SOME not exploiting EMSSAP features; a provider of services to PEDS and/or FEDS; a provider of one or more aspects of wired and/or wireless communications; an Enterprise 160 exploiting EMSSAP features; license databases; content databases; image databases; content libraries; customer databases; websites; and software applications for download to or access by FEDs and/or PEDs exploiting and/or hosting EMSSAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading/installing an application which provides EMSSAP features according to embodiments of the invention; execute an application already installed providing EMSSAP features; execute a web based application providing EMSSAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
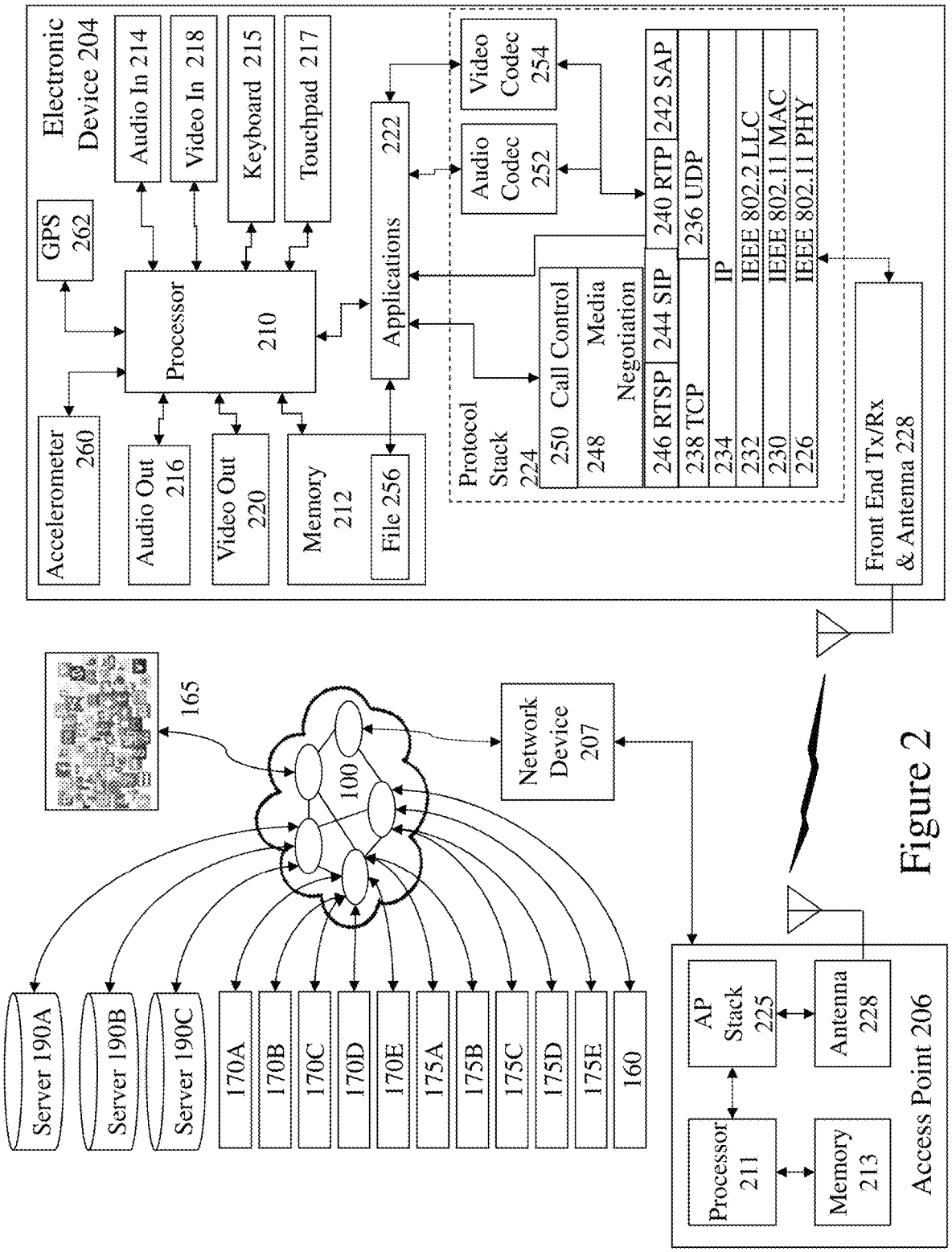
FIG. 2 depicts an electronic device supporting embodiments of the invention.

Now referring to FIG. 2 there is depicted an electronic device 204 and network access point 207 supporting EMSSAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Also connected to the network 100 are Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, nonvolatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Tx/Rx & Antenna Circuits 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206.

Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230. It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

One or more other devices, referred to as ASsociated DEVices (ASDEVs), not depicted for clarity may be coupled to the Electronic Device 204 through a wireless interface or wired interface, or optical interface. Such ASDEVs may include, but not be limited to, a wearable device, a PED, a FED, a medical implant etc.

The Front End Tx/Rx & Antenna 228A wirelessly connects the Electronic Device 204 with the Antenna 228B on Access Point 206, wherein the Electronic Device 204 may support, for example, a national wireless standard such as GSM together with one or more local and/or personal area wireless protocols such as IEEE 802.11a/b/g Wi-Fi, IEEE 802.16 WiMAX, and IEEE 802.15 Bluetooth for example. Accordingly, it would be evident to one skilled the art that the ASDEV with associated Electronic Device 204 may accordingly download original software and/or revisions for a variety of functions. In some embodiments of the invention the functions may not be implemented within the original as sold ASDEV and are only activated through a software/firmware revision and/or upgrade either discretely or in combination with a subscription or subscription upgrade for example. Accordingly, as will become evident in respect of FIGS. 3 to 14 respectively the Electronic Device 204 may provide the user with access to one or more EMSSAPs including, but not limited to, software installed upon the Electronic Device 204 or upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following descriptions in respect of FIGS. 3 to 14 respectively a remote system/server may form part or all of the Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively. Within the following descriptions in respect of FIGS. 3 to 14 respectively a local client device may be Electronic Device 204 such as a PED or FED and may be associated with one or more of the Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively. Similarly, a storage system/server within the following descriptions may form part of or be associated within one or more of the following descriptions in respect of FIGS. 3 to 14 respectively a remote system/server may form part of all of the Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively.

With respect to the following description in respect of FIGS. 3 to 20 and embodiments of the invention it would be understood that the invention is not limited to those particular embodiments. Rather, the invention is intended to cover all alternatives, modifications, and equivalent arrangements as may be included within the spirit and scope of the invention as defined by the claims.

Within an embodiment of the invention a system is provided allowing event planners to create one or more registration forms for staff, volunteers, etc. to complete which includes programmable (custom) questions that the event planner needs answered in order to determine the roles, qualifications and schedule for each person registering or registered to the system. Whilst within the following descriptions the context presented is the initial registration of a user completing a registration form it would be evident that the embodiments of the invention may also be employed when periodically updating registration information of registered users such that where custom questions are generated post-registration a user may be presented with an update request to complete those questions now part of the registration process not present when the user registered.

However, it would be evident to one of skill in the art that such forms even with a small number of individuals leads to a complex task for the event planner to assign individuals to the appropriate tasks. As an event may range from a few individuals such as for a business breakfast, a wedding etc., to thousands and more, for events such as the Olympics for example then every question and sub-question created adds further complexity to the already complex task. Accordingly, embodiments of the EMSSAP automatically generate custom filters based upon the question created and the format or form of the answer options provided to the registering. For example, the format or form of the answer options may be a simple "Yes/No" for example, or it may be a selection of an option from multiple options via a selection or "radio button" (a graphical control element allowing a user to select one of a predetermined set of mutually exclusive options), selection of multiple options through a multiple "check" or select, or an open format for customer generated response.

Accordingly, as users register and fill out the answers to the questions an event manager is presented with filters with which to filter the users in any list such that they can exploit custom filters created by the EMSSAPs according to embodiments of the invention in dependence upon the custom questions created. Further, EMSSAPs according to embodiments of the invention can automatically assess instances where evolution of the registration form with new custom questions results in gaps in previously registered user's data and generate custom registration updates to users for an event or events such that the event manager has updated information for users to filter against.

Hence, EMSSAPs according to embodiments of the invention allow an event planner to go to any list, for example a staff list, and filter it based on answers to the custom questions. It also allows the event planner to then select the users they want from the filtered list and perform an action. For example, such actions may include but not be limited to, "Add/Remove Role(s)", "Add/Remove Qualification(s)", "Add/Remove Shift(s)", and "Send a Communication." As events are generally dynamic in nature, and people in shifts can change at any time, combining the custom question answers with dynamic EMSSAP filters such as "Checked In" or "Scheduled Now", for example, allows for targeted communications to only those users to which it relates. For example, a communication can be triggered that notifies, for example, only users associated with a specific event, at a specific point in time, that are checked in, associated with a specific location, and who asked for a gluten free lunch that they can pick it up at a certain location at a certain time. Accordingly, the EMSSAPs according to embodiments of the invention allow for the real world real time scenario.

Within EMSSAPs according to embodiments of the invention the configuration for the event planner may allow them to predetermine responses to specific answers by users to specific questions so that a specific answer would automatically cause an automatic assignment without requiring the event planner's involvement such that the event planner is then focused to addressing those roles, shifts etc. for which gaps in the required personnel exist. For example, EMSSAPs according to embodiments of the invention where there was a question asking if the registering users had cardiopulmonary resuscitation (CPR) training, then on receiving the answer 'Yes", would automatically assign the person with CPR qualification within the data associated with them in the registered user database and add them automatically to a "First Aid" role where their availability overlapped with an event/shift etc. Within another example EMSSAPs according to embodiments of the invention could be "stacked" or employ logic processes based upon the answer to two or more questions such that an action could automatically be taken by the EMSSAP. Continuing with the CPR example, after the user had the qualification and role granted, if they then answered a question about their availability as being able to attend any event within a 250 km (155 miles) distance of their home then they could also be added to any role/shift overlapping their stated availability for any event within that distance to their home. In this manner, EMSSAPs according to embodiments of the invention can automatically assign based upon multiple responses within the user's responses. Within other instances EMSSAPs according to embodiments of the invention may employ the stacked responses to generate a potential pool of registered users who are then automatically contacted to see whether they can support a specific event at a specific location and a specific time.

Further, EMSSAPs according to embodiments of the invention may provide/require that further data is requested from a user in dependence upon the answer to a preceding question that may include either additional responses from the user to additional questions or the uploading of electronic content from the user which is then parsed to establish additional data. The additional questions with their responses and/or uploaded electronic content may be with respect to the registrant addressing a requirement with respect to specific role(s) for an event or events. Alternatively, the registrant may be asked to provide details of any qualifications etc. which are then subsequently employed to associate the registrant to a role or roles without the registrant being informed of such role(s). For example, a user responding that they have CPR qualification may be asked to upload a document to the EMSSAP which is related to the question, for example upload their CPR certificate, which is then processed and parsed to extract when their CPR qualification is valid. Accordingly, EMSSAPs according to embodiments of the invention may then be able to take subsequent actions such as informing the event planner whenever a user's document is about to expire, and remove a qualification from that user, take them out of a role automatically, or request the user upload their new qualification.

Within embodiments of the invention EMSSAPs may include specific questions targeted at roles already established within EMSSAP for an event or events where the requirement(s) have been defined by the event organizer or others within the EMSSAP. Alternatively, the accumulation of qualifications may be what the inventor refers to as "open ended" in that there was no existing requirement for a role with respect to the qualification uploaded and provided by registrants where subsequently the EMSSAP where a role with a new requirement is added scans its database of registrants to ascertain the identities of those having the requirement or requirements. Accordingly, in the example above a user uploads details of their CPR qualification where at that point in time no role having that requirement exists but they can be assigned to other roles for other events. Subsequently a role with the requirement for CPR qualification arises and the EMSSAP can determine that the registrant has the qualification and hence assign them to that role for an event or events where the availability of the registrant aligns with the event or events.

EMSSAPs according to embodiments of the invention may automatically perform a scan of events to determine whether registrants associated with a role for a forthcoming event that has an associated requirement or requirements still have a valid qualification. This may be a time based verification, such as daily, weekly, or monthly for example, or based upon a predetermined time point before the event being reached, such as a month or a week for example, and if not automatically performs one or more actions including, but not limited to, removing the registrant from the role, requesting an updated qualification from the registrant, removing the qualification from the registrant's information, and notifying the event organizer.

Accordingly, where their qualification is to expire then unless updated the EMSSAPs according to embodiments of the invention would un-schedule them from any shifts. For example, with a user indicating that they have a valid driver's license then this may be similarly parsed to define when the user is legally allowed to drive but also to determine what classes of vehicle the user is allowed to drive. Accordingly, a user with a California Class C license can be assigned to roles requiring operation of vehicles in this class as well as classes A and B allowing them to drive non-commercial and commercial vehicles trucks, $5^{th}$ wheels, etc. whilst a user with only a California Class A may be limited to non-commercial passenger vehicles for example.

Within embodiments of the invention EMSSAPs according to embodiments of the invention also support the generation of custom questions which are automatically generated based upon the importation of data from another source, e.g. a spreadsheet for example. There are many instances where data may be transferred from one EMSSAP to another such as an organization merging or acquiring another organization, an organization being asked to take over management of an existing event, migration by an organization or enterprise to another EMSSAP etc. Accordingly, EMSSAPs according to embodiments of the invention when importing user information from another source, e.g. a database, spreadsheet etc. exported from another systems or created manually, then where column header data (also known as field headers) within the imported information does not map to data already within the database of the EMSSAP then the EMSSAP creates a custom question created for it and creates a custom filter so that the existence of the new data/filter is evident to the user. EMSSAPs according to embodiments of the invention allow users to edit the question/filter subsequently but can also automatically trigger requests for updated information from existing registered users so that their responses to the new custom questions are also integrated to the database.

Within EMSSAPs according to embodiments of the invention all actions may occur at two levels of the system, one being the event level and the other being at the organization level as well as at a single level of the system.

Figure 3:
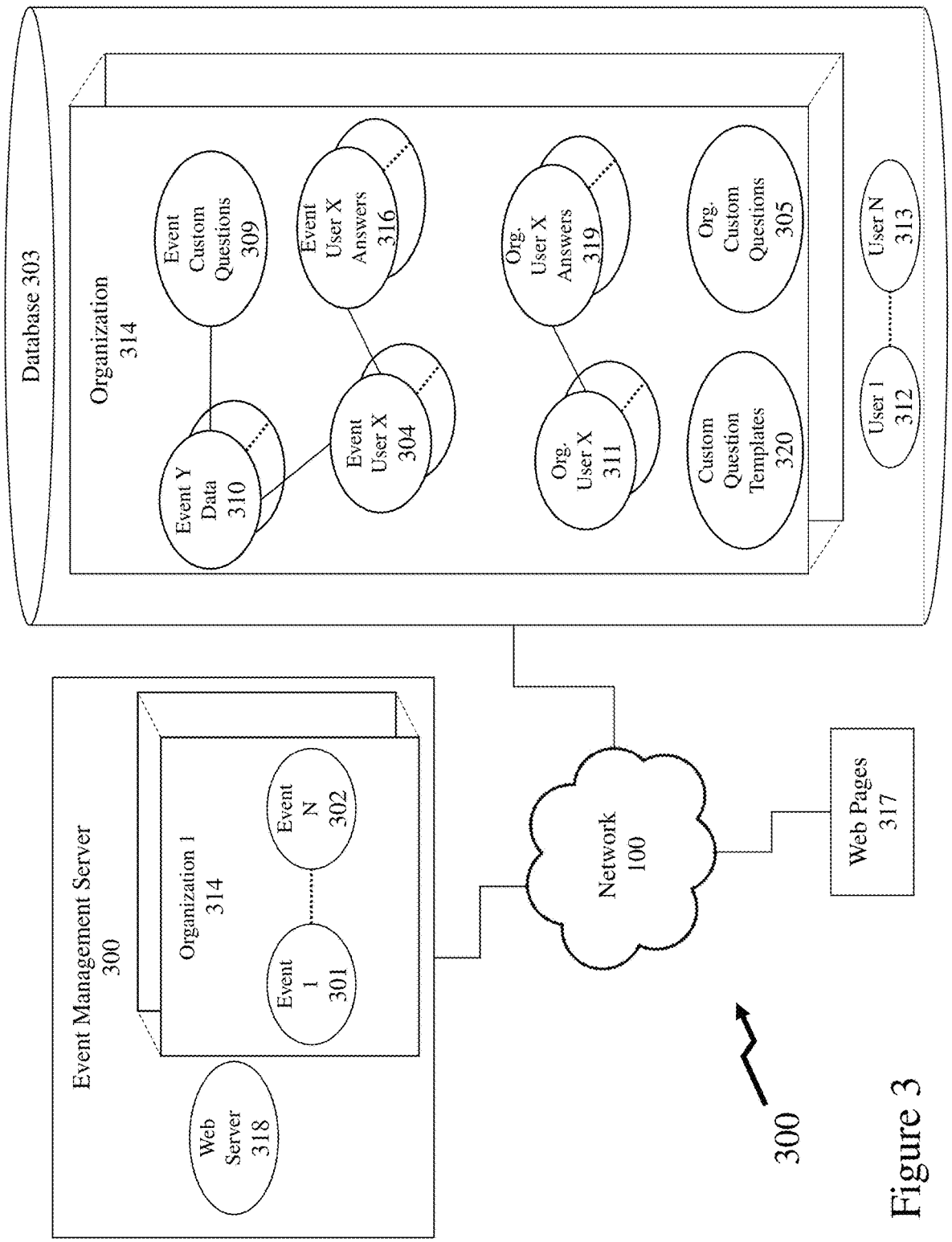
FIG. 3 depicts schematically the configuration of an event management software, system, application, and platform (EMSSAP) according to an embodiment of the invention.

Referring to FIG. 3 there is depicted schematically the configuration of an event management software, system, application, and platform (EMSSAP) according to an embodiment of the invention. As depicted an Event Management Server 300 connected to a Network 100. For each Organization 314 each event is depicted as a separate instance of a software execution, depicted as Event 1 301 to Event N 302. A Database 303 is also connected to the Network 100 which hosts data specific to each Organization 314. Within the data stored for each Organization 314, are:
Custom Question Templates 320;
Organization Custom Questions 305;
Organization User X 311; and
Organization User X Answers 319.

Also stored within the data for each Organization 1 314; are:
Event Y Data 310;
Event Custom Questions 309;
Event User X 304; and
Event User X Answers 316.

The Database 303 also contains user data, User 1 312 to User N 313, which is data specific to each user using the system. As such User 1 312 to User N 313 can be members on one or more Organizations 314. A plurality of Web Pages 317 are used to program all the elements of the EMSSAP and store them in the Database 303 through a Web Server 318 associated with or forming part of Event Management Server 300.

Figure 4A:
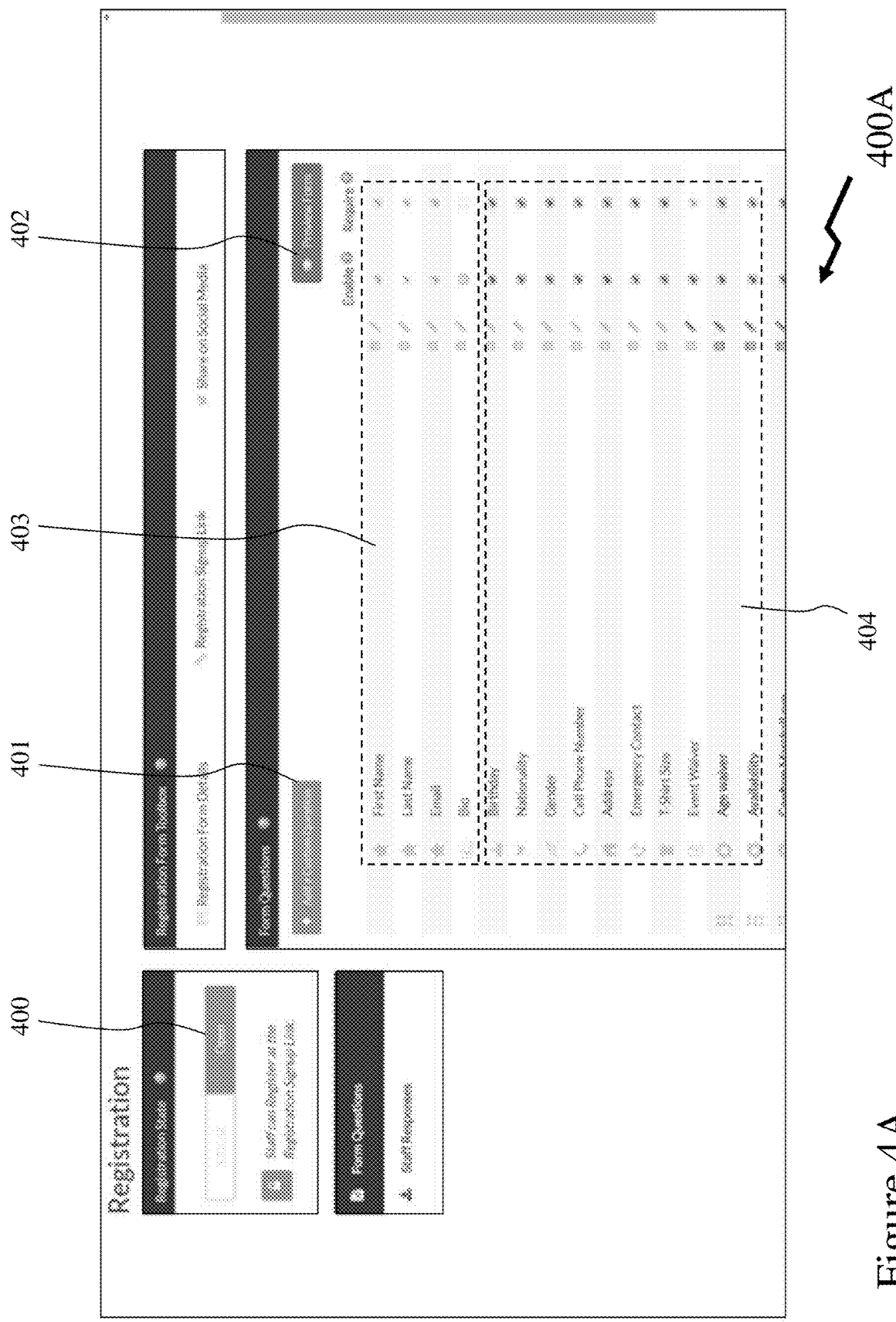
FIG. 4A depicts an exemplary graphical user interface (GUI) within an EMSSAP according to an embodiment of the invention relating to the addition of a custom question to a registration form.
Figure 4B:
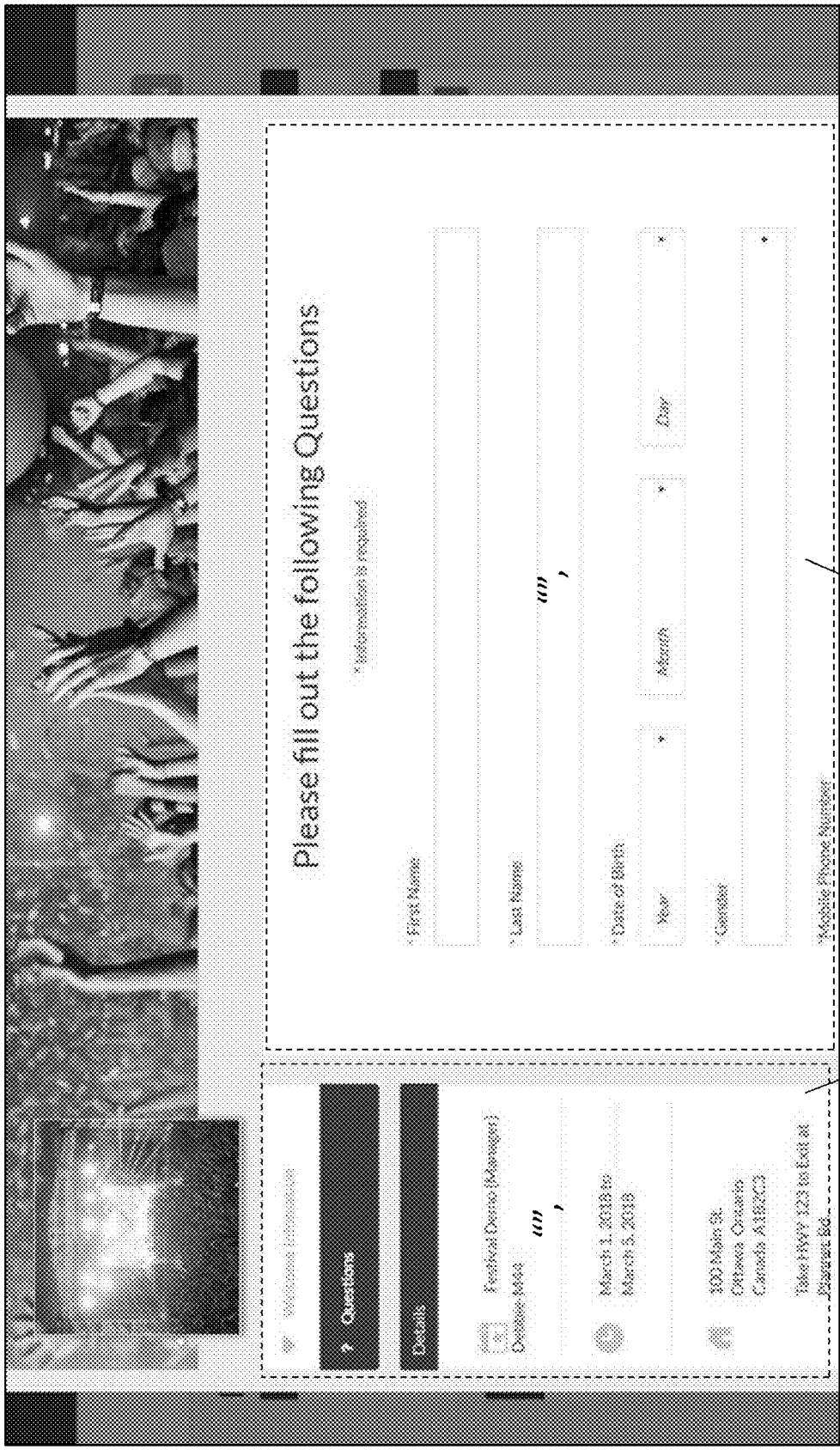
FIG. 4B depicts a preview of an exemplary registration form within a GUI presented to a user by an EMSSAP according to an embodiment of the invention.

Now referring to FIG. 4A there is depicted an exemplary graphical user interface (GUI) 400A within an EMSSAP according to an embodiment of the invention relating to the addition of a custom question to a registration form. As depicted GUI 400A is a registration GUI allowing a user to generate a registration form through the selection of registration form elements 404 which form part of the registration form in addition to default fields 403. As depicted default fields 403 include "First Name", "Last Name", and "Email" whilst options for form elements 404 include "Birthday", "Nationality", "Gender", "Cell Phone Number", "Address", "Emergency Contact", "T-Shirt Size", "Event Waiver", "Age Waiver", and "Availability." The registration form generated relates to an event which is "Open" wherein new registering users can register for the event as opposed to a "Closed" event where users are assigned to roles etc. based upon registrations already made. For example, an event management company may have a standard roster of users whom they can assign to some categories or size of event but then in other instances seek additional personnel through seeking new registrants. First button 401 allows the user to add a custom question to the registration form whilst second button 402 allows them to view a preview of the form. Such a preview is depicted in FIG. 4B with exemplary GUI 400B which includes a form preview 405 which is displayed after the user selects an event for which the details are depicted in event pane 406.

Figure 5A:
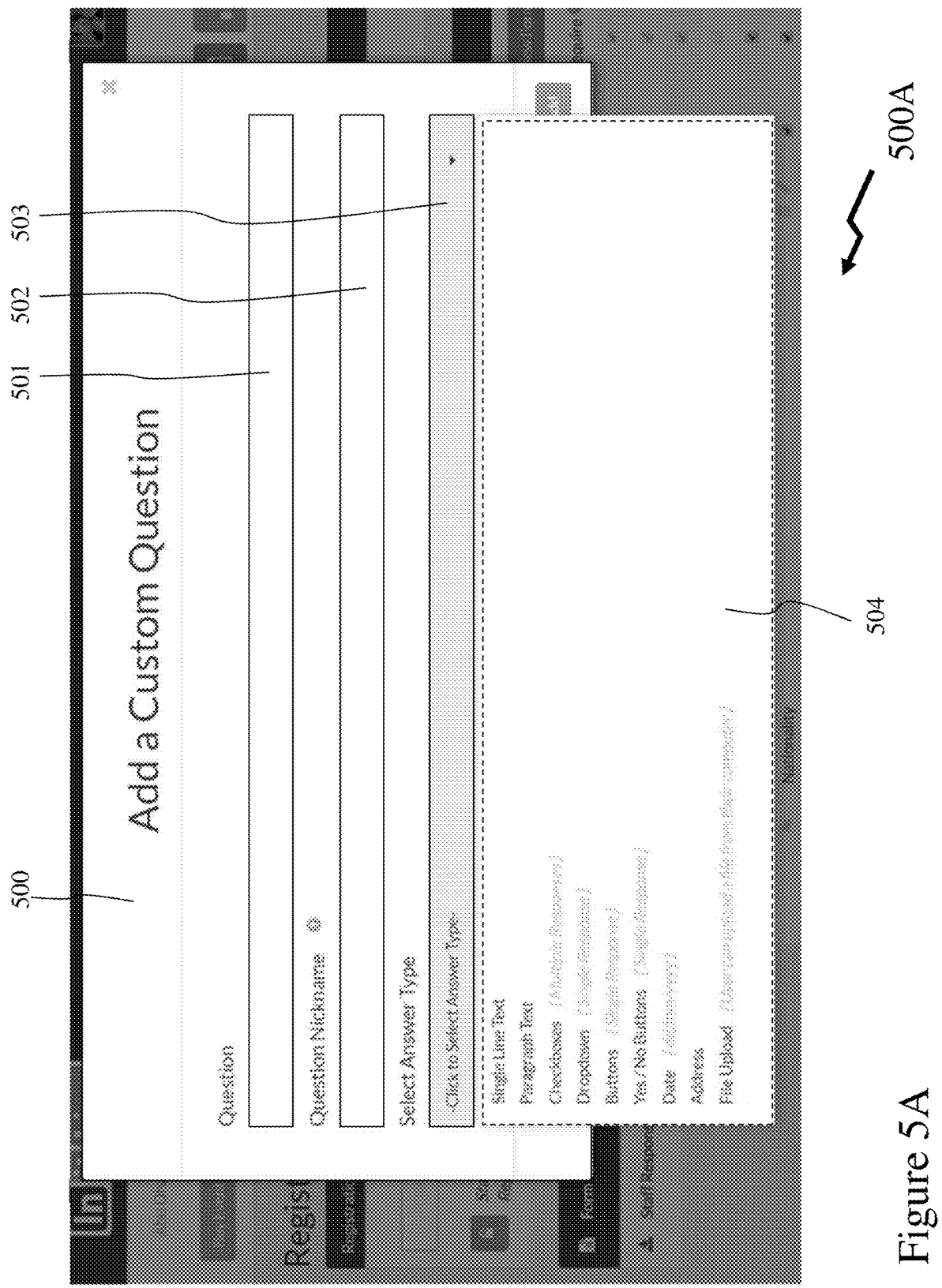
FIG. 5A depicts an exemplary GUI presented to a user by an EMSSAP according to an embodiment of the invention upon their selection of an option to add a custom question.

Now referring to FIG. 5A there is depicted an exemplary GUI 500A presented to a user by an EMSSAP according to an embodiment of the invention upon their selection of an option to add a custom question, e.g. via first button 401 in FIG. 4A. Accordingly, the EMSSAP presents custom question window 500 within GUI 500A providing fields:
Question 501, wherein the user enters the text to be presented to the user when the question is rendered;
Nickname 502, which is employed within the EMSSAP to refer to the custom question in short-form format; and
Answer Type 503, which when selected triggers pop-up window 504 depicting the standard formats for questions.

As depicted Answer Type 503 options include Single Line Text, Paragraph Text, Checkboxes, Dropdown, Buttons, Yes/No Buttons, Data, Address, and File Upload. Accordingly, the user can add a custom question, type the question, give it a nickname to show in the list of filters, and select the type of answer they wish for the question.

Figure 5B:
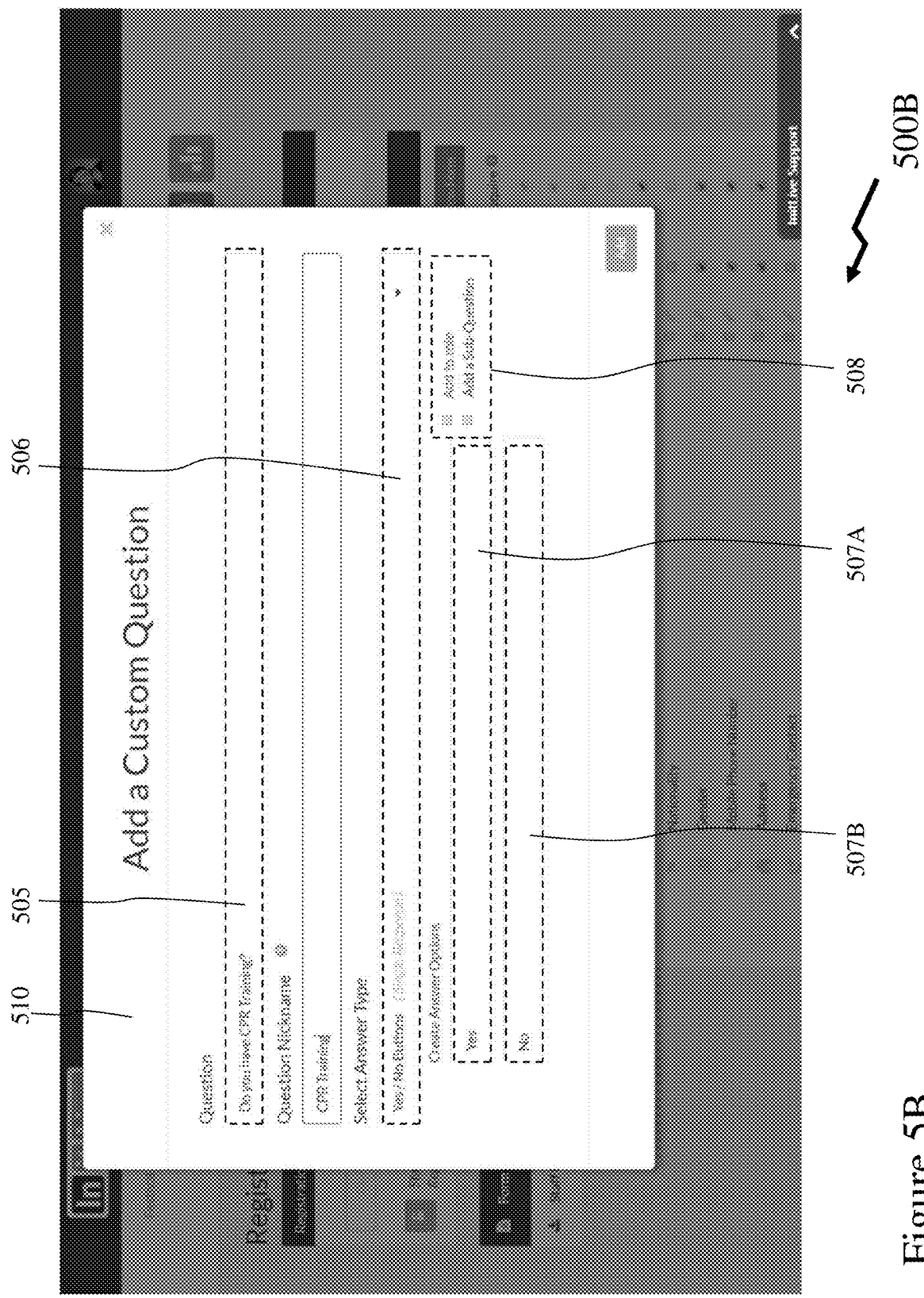
FIG. 5B depicts an exemplary GUI presented to a user by an EMSSAP according to an embodiment of the invention upon their selection of an option with respect of answer type within a custom question being added.

Now referring to FIG. 5B there is depicted an exemplary GUI 500B presented to a user by an EMSSAP according to an embodiment of the invention upon their selection of an option with respect of answer type within a custom question being added. As depicted window 510 within GUI 500B depicts the Question 505, Question Nickname 506, and Answer Type 507. Also depicted are the answer options 507A and 507B, which are Yes, No in this instance as the user selected that the answer type is Yes/No buttons. Also depicted are options 508 which allow the user to add a role to the custom question so that if a registering user selects Yes then the registrant is automatically associated with the role. The user may also add a sub-question.

Figure 6:
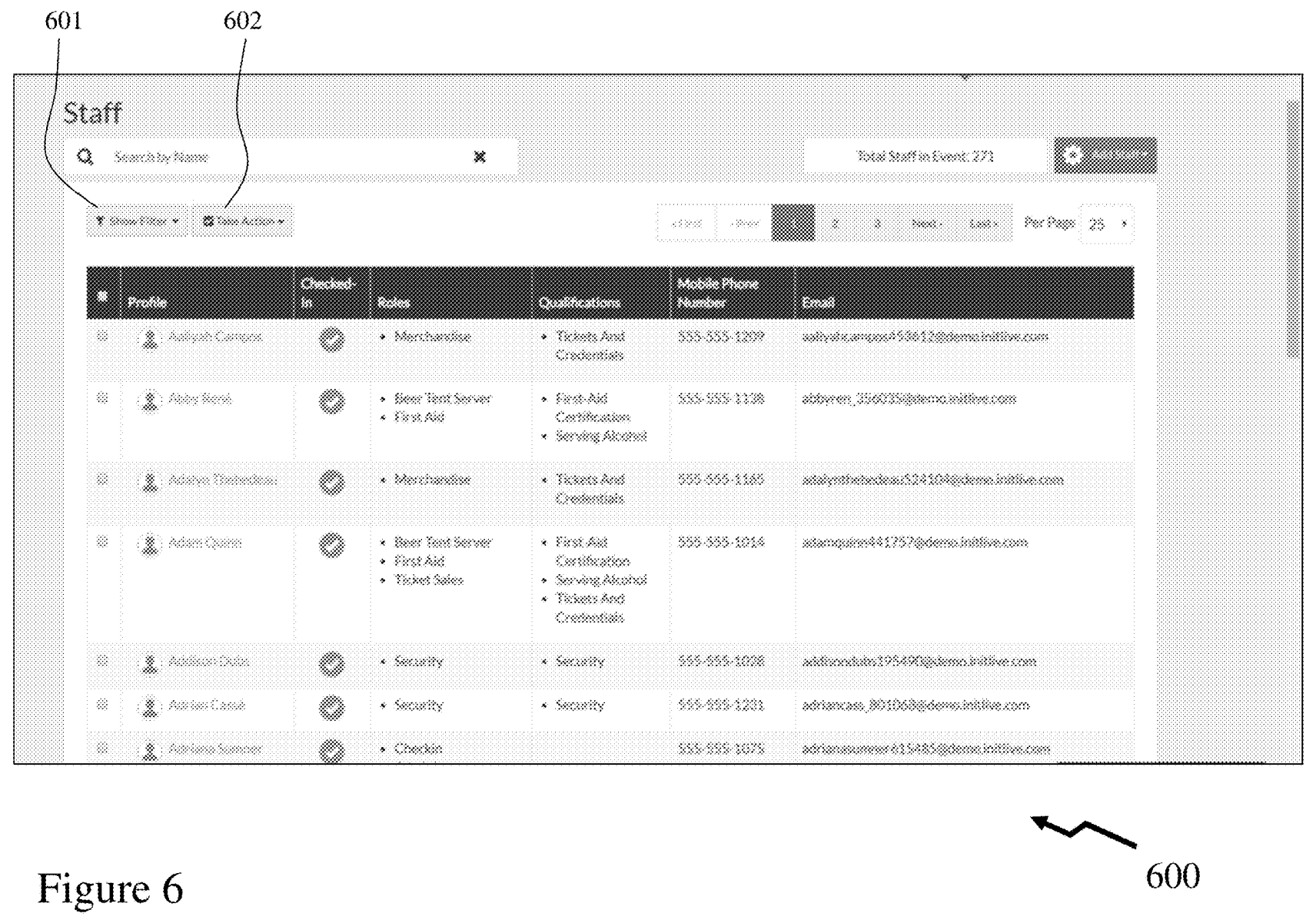

Referring to FIG. 6 there is depicted an exemplary GUI 600 presented to a user by an EMSSAP according to an embodiment of the invention indicating users together with options to select filters and/or actions to be performed. As depicted the GUI 600 comprises a listing of registered users wherein the event organizer viewing the listing is also presented with buttons allowing them to display filters, first button 601, and actions that can be performed, second button 602.

Figure 7A:
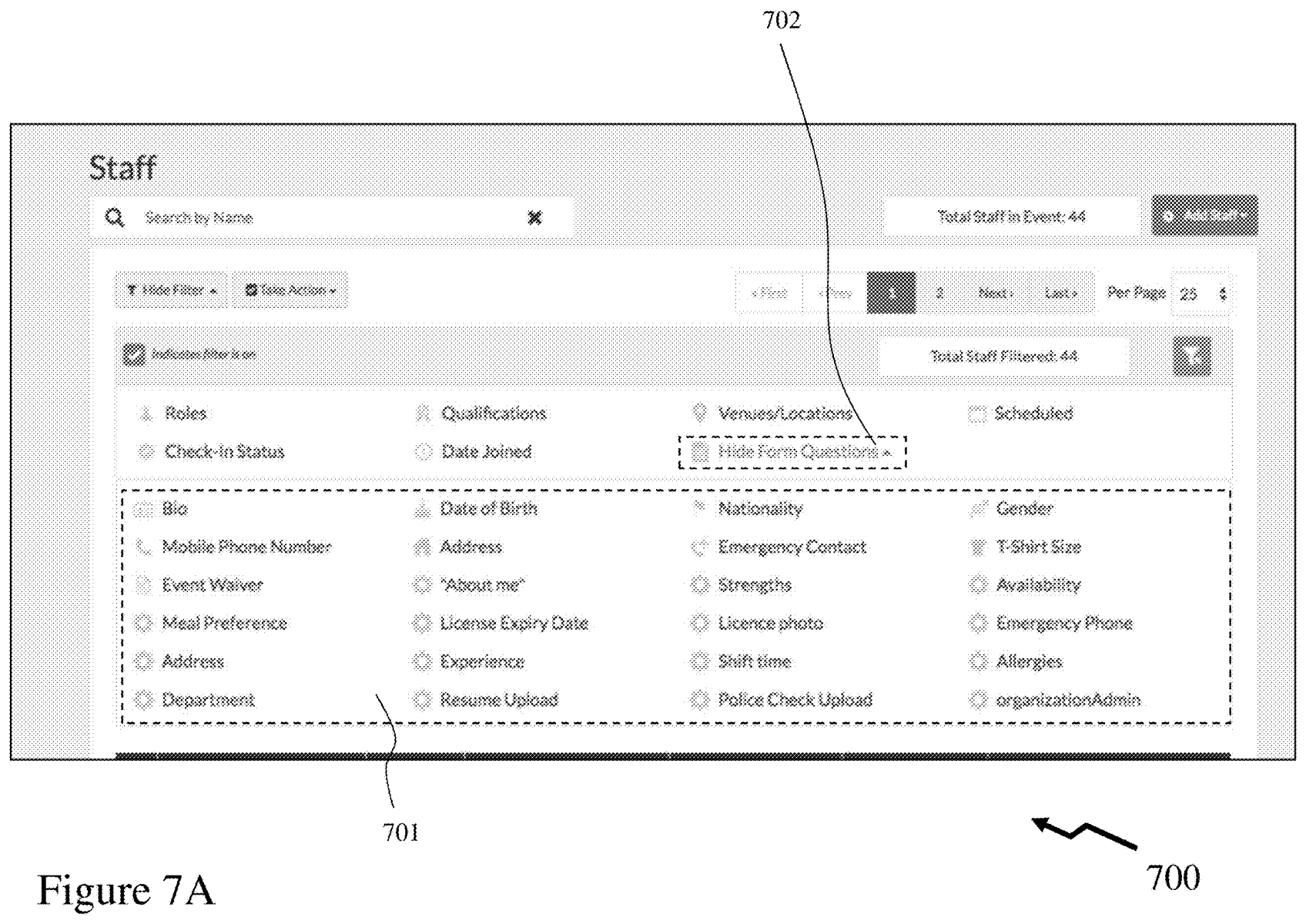

Referring to FIG. 7A there is depicted an exemplary GUI 700A presented to a user by an EMSSAP according to an embodiment of the invention upon selection of filter options, e.g. selecting first button 601 wherein the GUI 700A depicts the filters in window 701 where their Nicknames are displayed and can be selected such that they are applied to the user list. The option also exists for the event organizer with option 402 to hide the form questions.

Figure 7B:
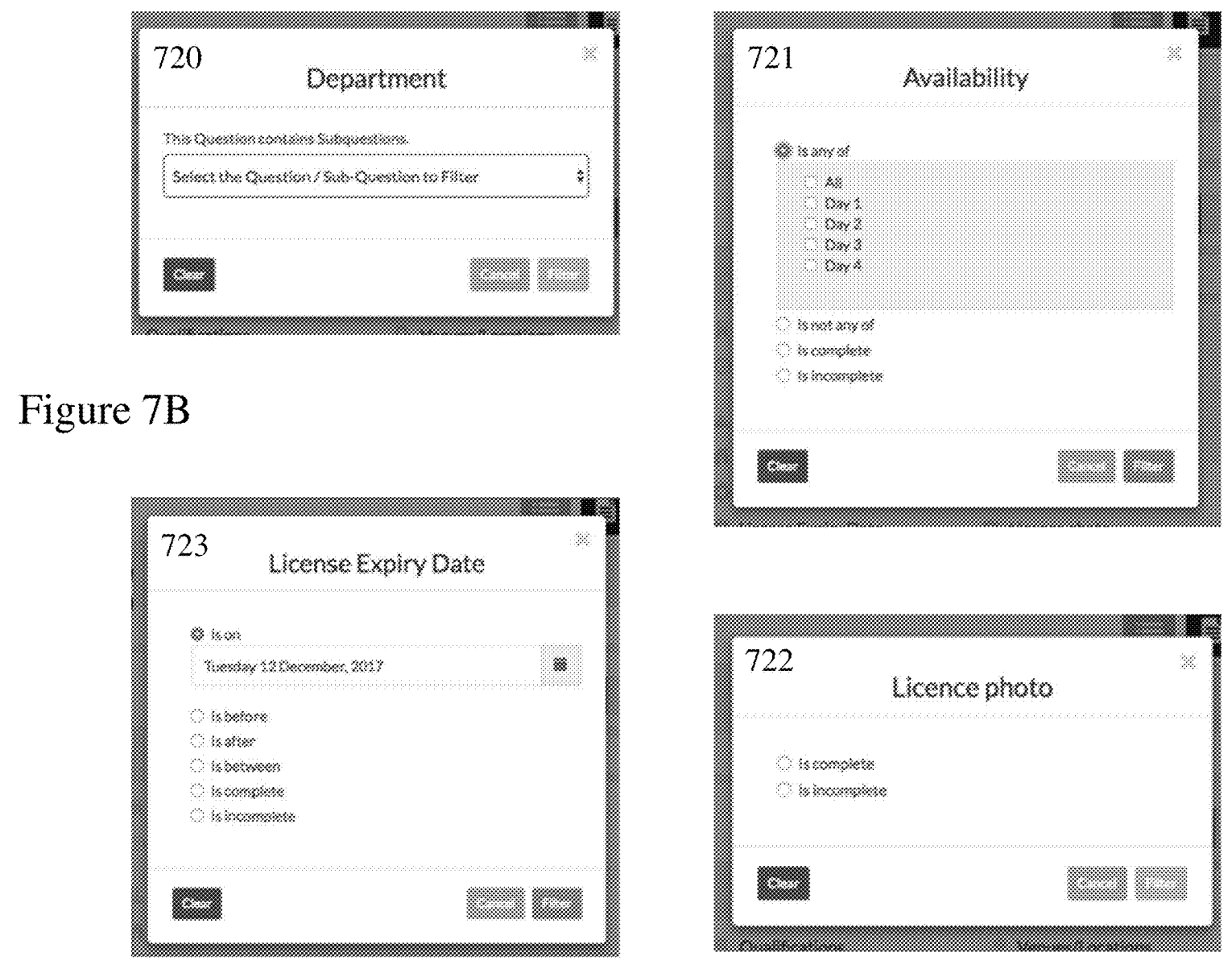

Now referring to FIG. 7B there are depicted exemplary GUIs presented to a registering user by an EMSSAP according to an embodiment of the invention relating to different question filters established in dependence upon the type of answer selected by a user generating the question. These being:
  First GUI 720 depicts the scenario where there was a sub-question added to the question and hence it must be selected also before the user can continue;
  Second GUI 721 representing a multiple selection answer;
  Third GUI 722 representing a single response question; and
  Fourth GUI 723 where a response requires a date be entered.

Figure 8:
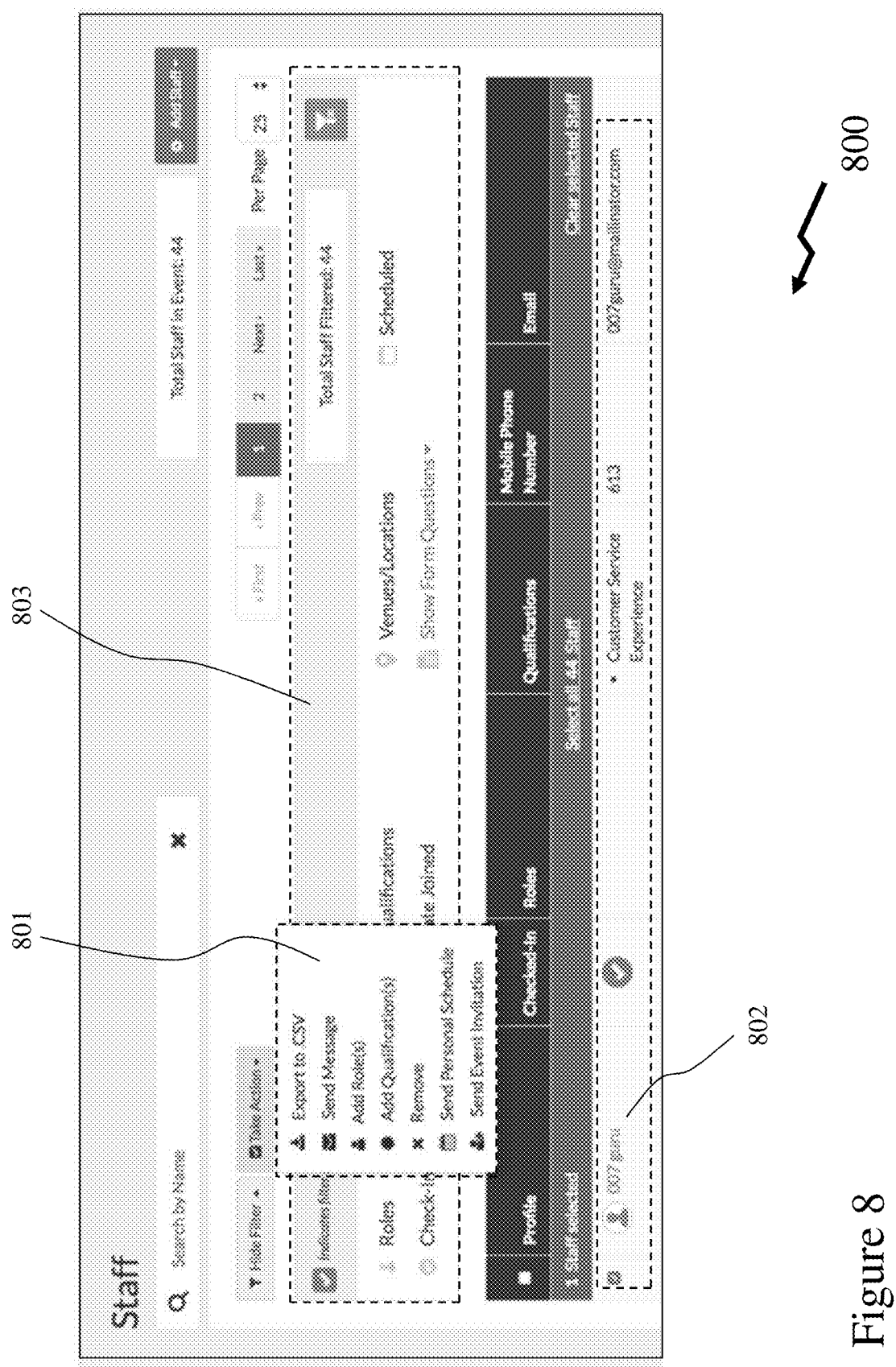
FIG. 8 depicts an exemplary GUI presented by an EMSSAP according to an embodiment of the invention upon selection of a "Take Action" button by an event organizer.

Referring to FIG. 8 there is depicted an exemplary GUI 800 presented by an EMSSAP according to an embodiment of the invention upon selection of a "Take Action" button by an event organizer, for example second button 602 in FIG. 6, which triggers pop-up window 801 depicting the actions available to the user. These being depicted as:
  Export to CSV;
  Send Message;
  Add Role(s);
  Add Qualification(s);
  Remove;
  Send Personal Schedule; and
  Send Event Invitation.

Within GUI 800 the action selected is performed with respect to the 1 Staff Selected based upon the user's selection within the displayed list 802. This displayed list being generated based upon filters applied by the user and upon the selection(s) made with respect to roles, qualifications, venues, scheduled, checked-in, etc. made by the user within selection window 803. Alternatively, the user can perform the action with respect to all staff, in this instance 44 staff, within the list generated after the application of the filter(s). The user can also clear the list and re-start applying the filter(s) to identify users for another role, venue, location, etc.

Figure 9:
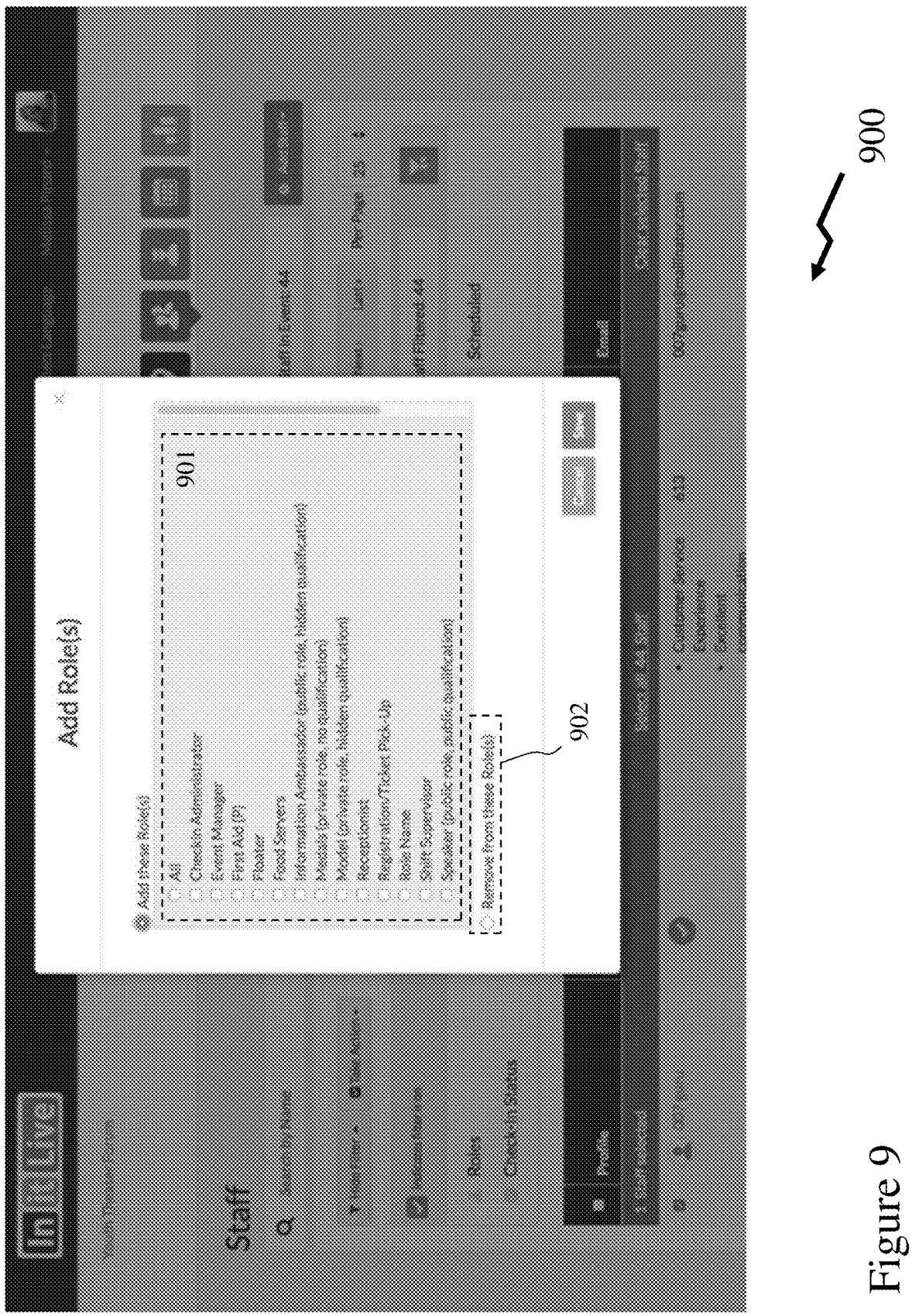
FIG. 9 depicts an exemplary GUI presented by an EMSSAP according to an embodiment of the invention relating to "Add/Remove" role(s)

Now referring to FIG. 9 there is depicted an exemplary GUI 900 presented by an EMSSAP according to an embodiment of the invention relating to "Add/Remove" role(s) where a user can add one or more roles or remove one or more roles. The removal being based upon selection of checkbox 902 whilst the role(s) are listed within list 901.

Figure 10:
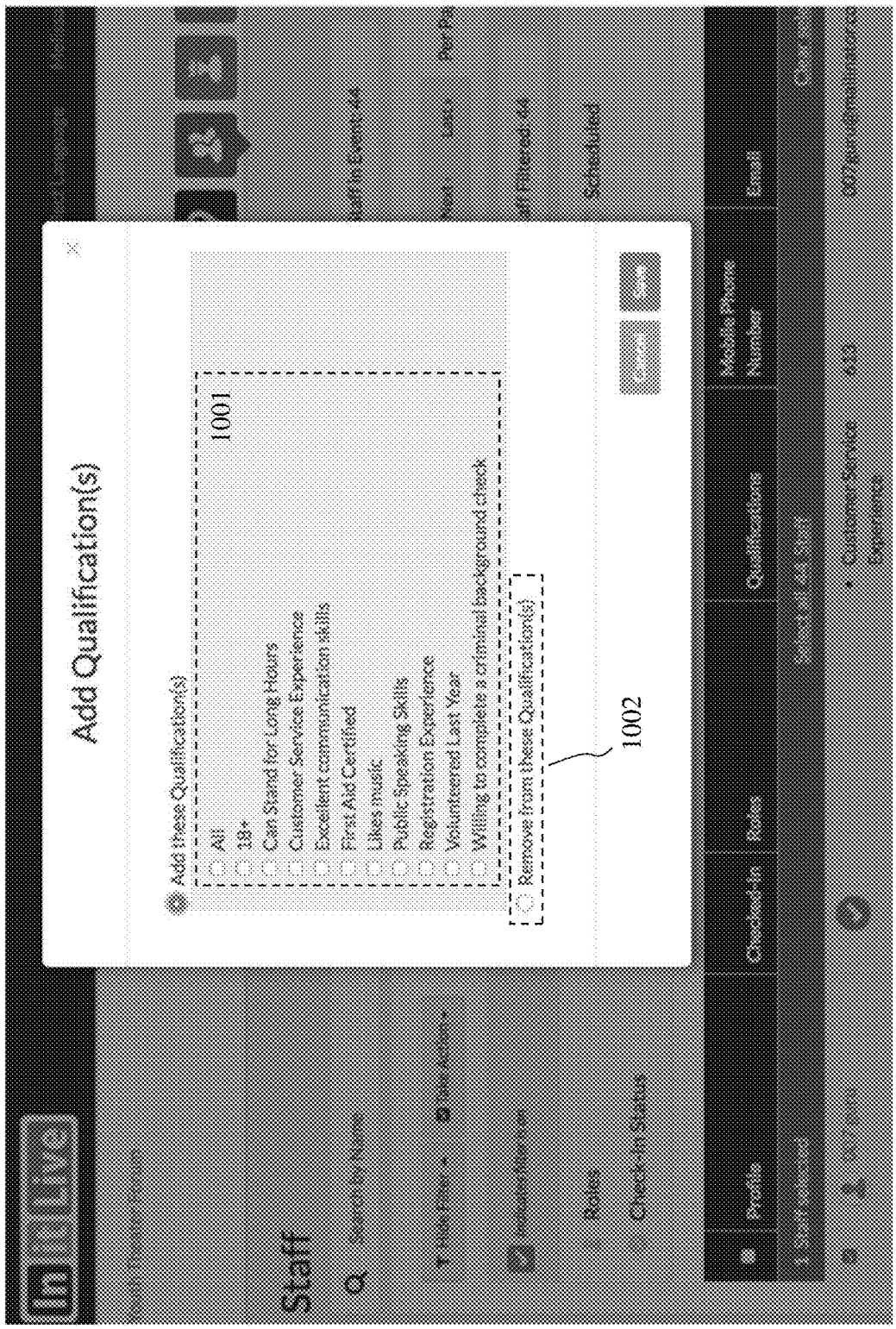
FIG. 10 depicts an exemplary GUI presented by an EMSSAP according to an embodiment of the invention relating to "Add/Remove Qualification(s)"

Referring to FIG. 10 there is depicted an exemplary GUI 1000 presented by an EMSSAP according to an embodiment of the invention relating to "Add/Remove Qualification(s)" where a user can add one or more qualifications or remove one or more qualifications. The removal being based upon selection of checkbox 1002 whilst the qualification(s) are listed within list 1001.

Figure 11A:
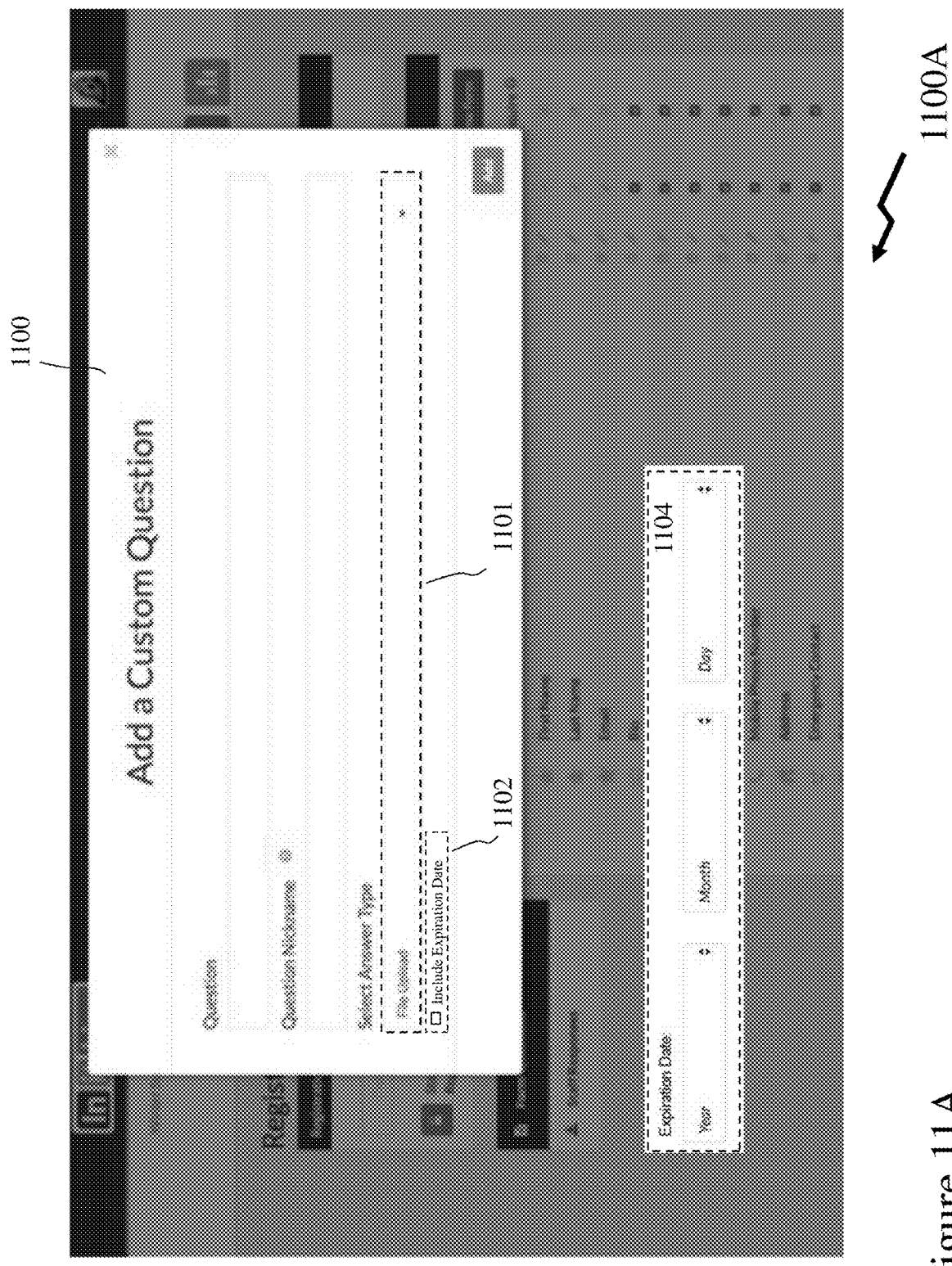
FIGS. 11A and 11B depict exemplary GUIs presented by an EMSSAP according to an embodiment of the invention relating to a registering user uploading a file which includes a specific expiration date.
Figure 11B:
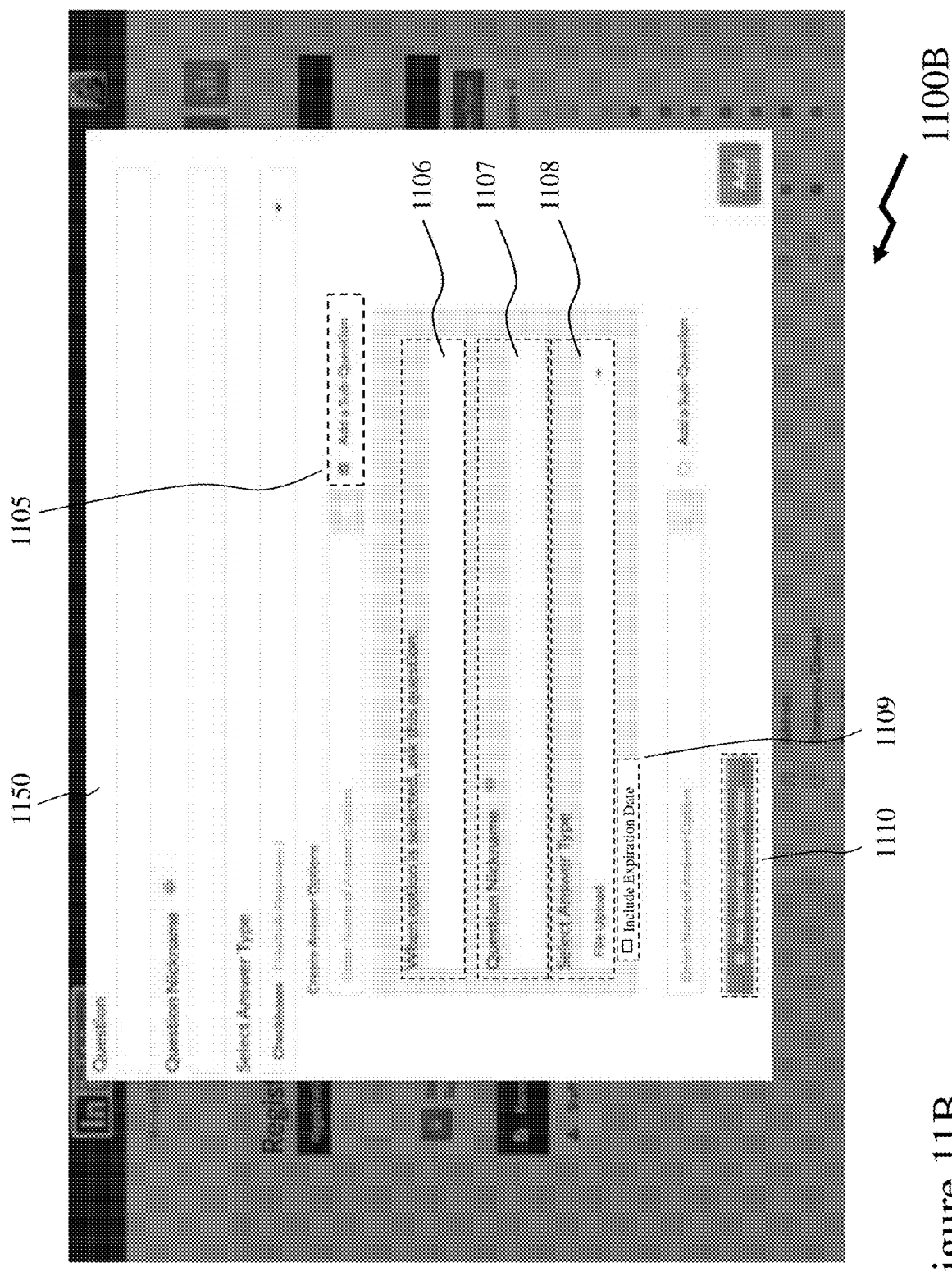

Now referring to FIGS. 11A and 11B there are depicted exemplary first and second GUIs 1100A and 1100B respectively presented by an EMSSAP according to an embodiment of the invention relating to a registering user uploading a file which includes a specific expiration date. Within first GUI 1100A a user is adding a custom question 1100 which now requires that the registering user uploads a file relating to a qualification where options of how to upload are presented through selection of drop-down option 1101. The user can also require that the registering user enter an expiration date by selecting checkbox 1102. Pop-up 1104 depicts an example of the pop-up displayed to the registering user to enter the expiration date for the qualification that they are asked to upload in response to the custom question.

Within second GUI 1100B the user creating the custom question is presented with first button 1105 within window 1150 within the second GUI 1100B. When selected this triggers first to third fields 1106 to 1108 respectively:
  First field 1106 where the user enters the question to be posed as the sub-question;
  Second field 1107 where the user enters the nickname of the sub-question; and
  Third field 1108 where the user can select the answer type as outlined and described previously.

The user can also elect to require that an expiration data is added through checkbox 1109 and add a further answer option with button 1110.

Within the preceding and following descriptions in respect of FIGS. 3 to 16 reference to a header within a database, source of data etc. refers to a header against which data is stored. Such headers being known as field headers with respect to databases, column headers in spreadsheets etc.

Figure 12:
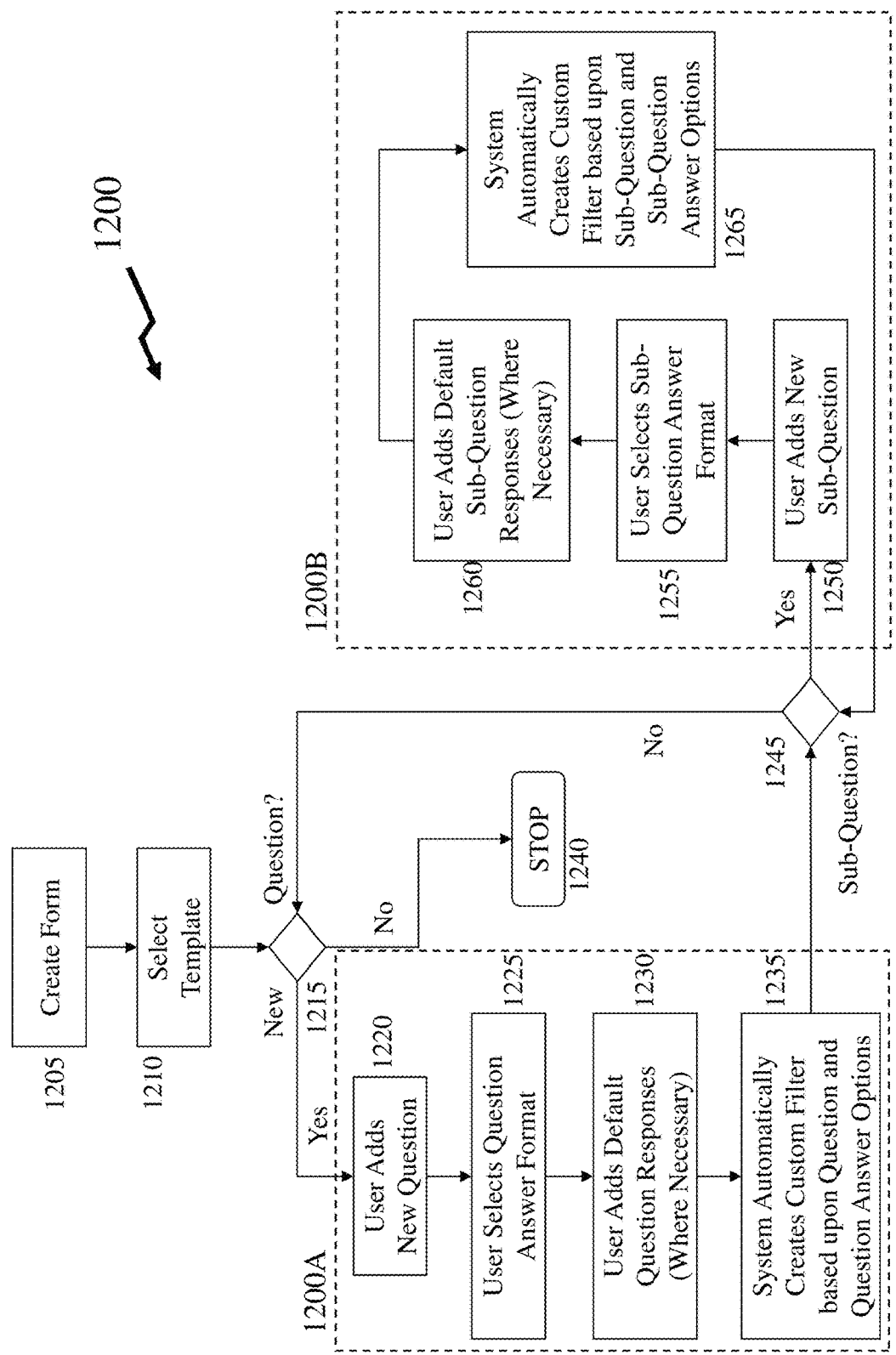
FIG. 12 depicts an exemplary process flow for an EMSSAP according to an embodiment of the invention relating to the generation of a registration form by a user and the automatic generation of custom filters by the EMSSAPP.

Now referring to FIG. 12 there is depicted an exemplary process flow 1200 for an EMSSAP according to an embodiment of the invention relating to the generation of a registration form by a user and the automatic generation of custom filters by the EMSSAPP. As depicted the process flow 1200 comprises first to thirteenth steps 1205 to 1265 respectively. Accordingly, the process begins at first step 1205 where the user selects to create a form and then in second step 1210 selects a template from which to generate the registration form. At third step 1215 the user is then asked whether they wish to add a new question, wherein if they respond yes, the process proceeds to first sub-process 1200A otherwise it proceeds to fourth step 1240 and stops.

First sub-process 1200A comprises fifth to eighth steps 1220 to 1235 respectively which are:
  Fifth step 1220 wherein the user adds the new question;
  Sixth step 1225 wherein the user selects the format for the new question;
  Seventh step 1230 wherein the user adds default responses as necessary; and
  Eighth step 1235 wherein the EMSSAP automatically creates a custom filter to add to the filter options presented to the user based upon the question and the question answer options and the process proceeds to ninth step 1245.

In ninth step 1245 the user is prompted as to whether they wish to add a sub-question or not. If not, the process proceeds back to step third 1215 to ascertain whether the user wishes to add another question and if the user does wish to add a question the process proceeds to second sub-process 1200B. Second sub-process 1200B comprising tenth to thirteenth steps 1250 to 1265 respectively. These being:

Tenth step 1250 wherein the user adds the new sub-question;

Eleventh step 1255 wherein the user selects the format for the new sub-question;

Twelfth step 1260 wherein the user adds default responses as necessary; and

Thirteenth step 1265 wherein the EMSSAP automatically creates a custom filter to add to the filter options presented to the user based upon the sub-question and the sub-question answer options and the process proceeds to ninth step 1245.

Accordingly, the user can elect to add another sub-question through repeating second sub-process 1200B or returning to third step 1215.

Figure 13:
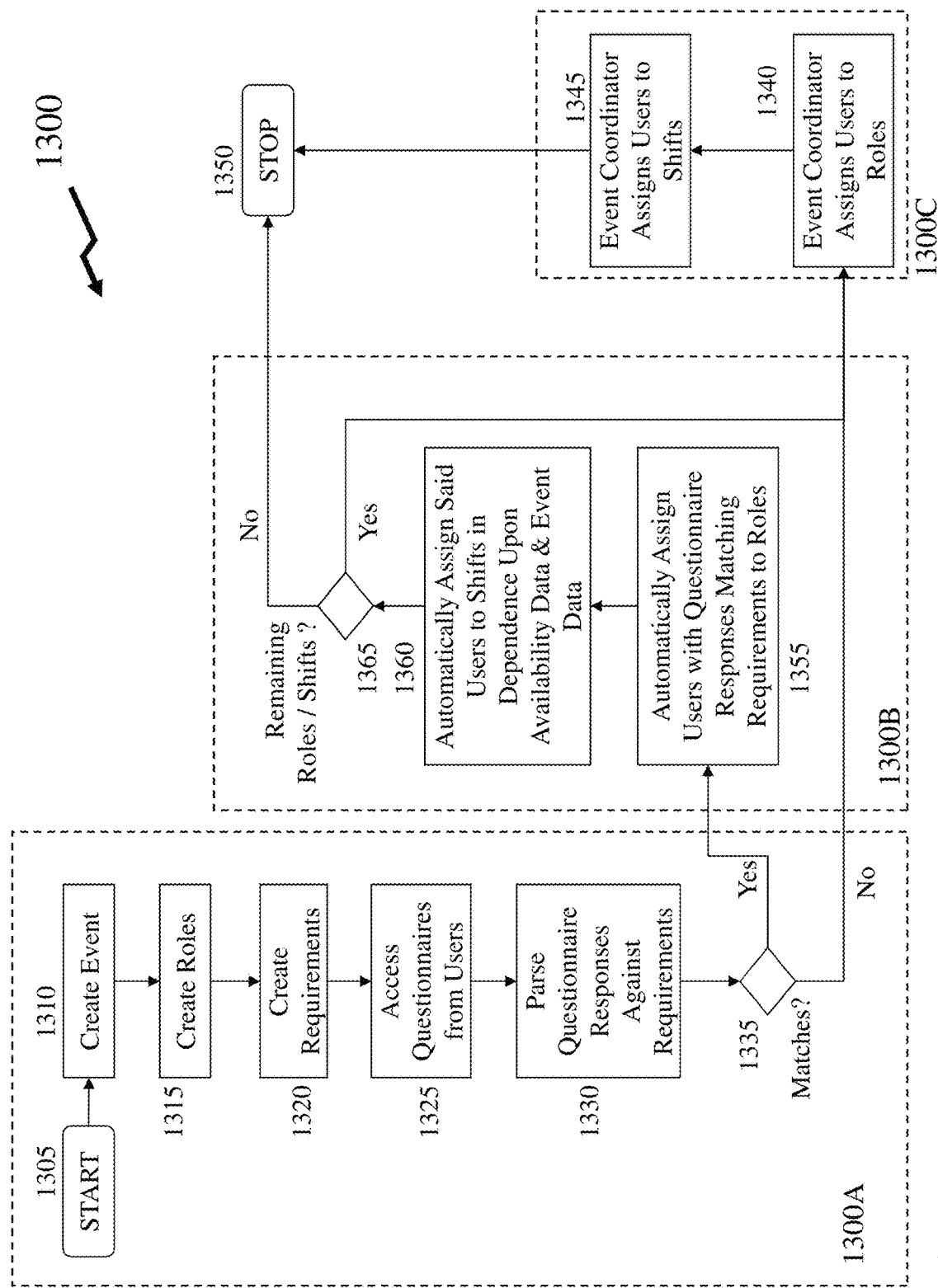
FIG. 13 depicts an exemplary process flow for an EMSSAP according to an embodiment of the invention relating to the assignment of registered users to an event based upon entries made by the registered users within a registration form.

Now referring to FIG. 13 there is depicted an exemplary process flow 1300 for an EMSSAP according to an embodiment of the invention relating to the assignment of registered users to an event based upon entries made by the registered users within a registration form. As depicted the process flow 1300 comprises first to third sub-processes 1300A to 1300C respectively comprising first to thirteenth steps 1305 to 1365. First sub-process 1300A comprising:

First step 1305 wherein the user initiates the process within an EMSSAP;

Second step 1310 wherein the user creates an event;

Third step 1315 wherein the user creates roles for the event;

Fourth step 1320 wherein the user creates requirements for the roles for the event;

Fifth step 1325 wherein the user accesses questionnaires from the users;

Sixth step 1330 wherein the EMSSAP parses the questionnaire responses against the requirements; and Seventh step 1335 wherein the process determines whether there are matches or not wherein it proceeds to second sub-process 1300B where matches are found and third sub-process 1300B when there are no matches.

Within fifth step 1325 the user may be able to access questionnaires generated by different groups of users individually or in combination. For example, a user within an organization may be able to select a single division or group within the organization or access multiple divisions or groups within the organization. Alternatively, the user may select different organizations from available organizations. Optionally, the user may elect to access regular staff or employees separately to volunteers, temporary staff etc.

Second sub-process 1300B comprising:

Eighth step 1355 wherein the EMSSAP automatically assigns users with questionnaire responses matching requirements for roles to the roles;

Ninth step 1360 wherein the EMSSAP automatically assigns the automatically assigned users to shifts in dependence upon the availability data and event data; and Tenth step 1365 wherein the process 1300 determines whether all roles/shifts have been assigned or not wherein if all roles/shifts have been assigned then the process proceeds to eleventh step 1350 and stops otherwise it proceeds to third sub-process 1300C.

Third sub-process 1300C comprising:

Twelfth step 1340 wherein the event coordinator assigns users to roles; and

Thirteenth step 1345 wherein the event coordinator assigns the assigned users to shifts.

Figure 14:
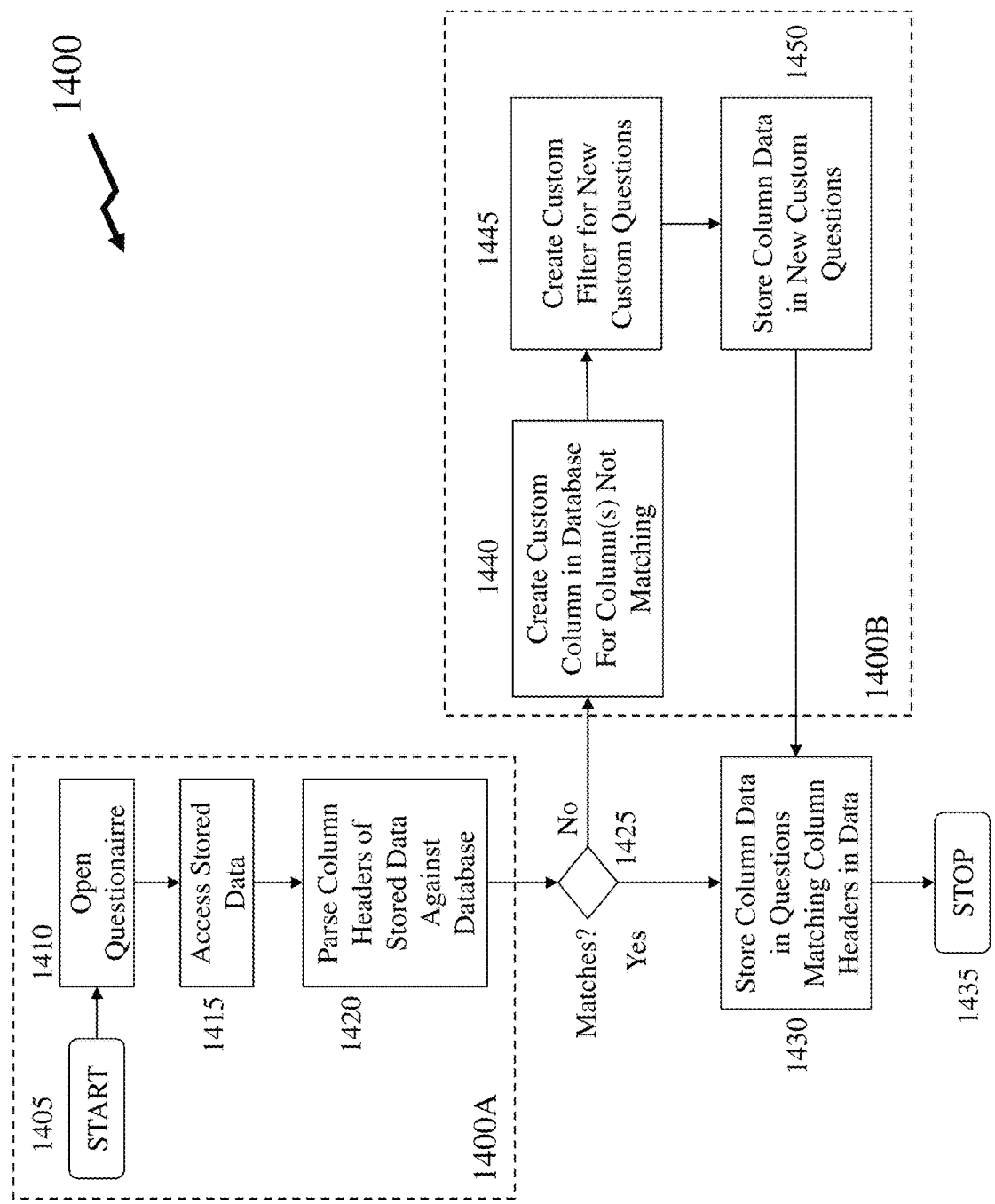
FIG. 14 depicts an exemplary process flow for an EMSSAP according to an embodiment of the invention relating to importation/migration of data into an EMSSAP.

Referring to FIG. 14 there is depicted an exemplary process flow 1400 for an EMSSAP according to an embodiment of the invention relating to importation/migration of data into an EMSSAP. As depicted process flow 1400 comprises first to tenth steps 1405 to 1450 respectively with first and second sub-process 1400A and 1400B respectively. First sub-process 1400A comprises first to fourth steps 1405 to 1420 respectively:

First step 1405 wherein the user initiates the process within an EMSSAP;

Second step 1410 wherein the user opens a database;

Third step 1415 wherein the EMSSAP accesses stored data identified by the user; and Fourth step 1420 wherein the EMSSAP parses the headers of the stored data against the questionnaire.

In fifth step 1425 the EMSSAP determines whether there are column data headers that do not match the database wherein it proceeds to second sub-process 1400B otherwise it proceeds to sixth step 1430. In sixth step 1430 the EMSSAP stores column data in questions matching column headers in the data before proceeding to seventh step 1435 and stopping. For example, if the stored data identified by the user is a spreadsheet then the EMSSAP parses the spreadsheet, identifies column headers and determines whether these match questions within the database. Hence, if the spreadsheet contains a column header "First Name" then the data within this column is entered into the database against the question "First Name." However, if the spreadsheet contains a column header "CPR Training" which does not match a question within the database then the process 1400 proceeds to second sub-process 1200B.

Second sub-process 1200B comprises eighth to tenth steps 1440 to 1450 respectively which are:

Eighth step 1440 wherein the EMSSAP establishes a custom column in the database for a column not matching with or without additional input from the user;

Ninth step 1450 wherein the EMSSAP establishes a custom filter for the column not matching with or without additional input from the user; and Tenth step 1460 wherein the EMSSAP stores column data extracted from the data source into the database against the new question and then proceeds to step 1430 to store column data matching column data headers.

Accordingly, using the example above where the spreadsheet contains a column header "CPR Training" which does not match a question within the database then the EMSSAP through process 1400 generates a new question "CPR Training" and stores the responses within the spreadsheet from each registered user within the database against this new question. Then the EMSSAP generates a custom filter "CPR Training" which is presented to the user when they seek to filter the registered users. In some embodiments of the invention this process proceeds without any user interaction. However, within other embodiments of the invention the EMSSAP may prompt the user to select a format of the question rather than automatically parsing the data within the spreadsheet for this column to determine the type of question format.

Figure 15:
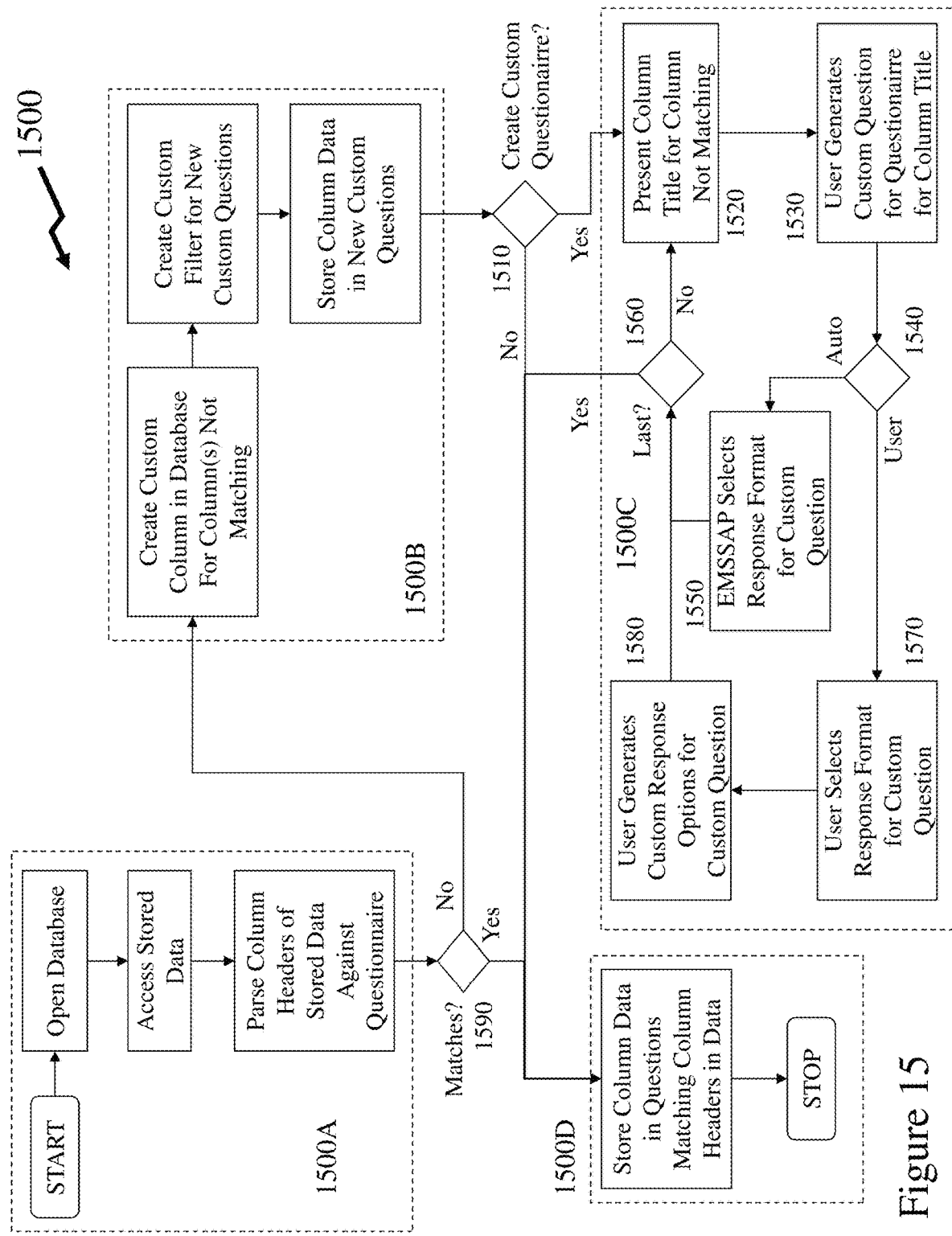
FIG. 15 depicts an exemplary process flow for an EMSSAP according to an embodiment of the invention relating to importation/migration of data into an EMSSAP.

Now referring to FIG. 15 there is depicted an exemplary process flow 1500 for an EMSSAP according to an embodiment of the invention relating to importation/migration of data into an EMSSAP. As depicted the process flow 1500 comprises first to fourth sub-processes 1500A to 1500D respectively together with first process step 1590. First sub-process 1500A comprises steps equivalent to first sub-process 1400A in FIG. 14 comprising first to fourth steps 1405 to 1420. At first process step 1590 the EMSSAP determines whether there are matches or not. If there are not the process proceeds to second sub-process 1500B otherwise it proceeds to fourth sub-process 1500D. Second sub-process 1500B comprises steps equivalent to eighth to tenth steps 1440 to 1460 respectively. Fourth sub-process 1500D comprises steps equivalent to sixth and seventh steps 1430 and 1435 respectively in FIG. 14.

From second sub-process 1500B the process proceeds to second step 1510 wherein the EMSAPP establishes whether the user wishes to generate a custom questionnaire from the data being imported or not wherein it proceeds to either third sub-process 1500C or fourth sub-process 1500D. In third sub-process 1500C comprising third to ninth steps 1520 to 1580 respectively the EMSSAP proceeds to:

Third step 1520 wherein the EMSSAP presents a column title that does not match the database to the user Fourth step 1530 wherein the user generates a custom question for the questionnaire to capture data for the column title not matching the database for subsequent registering users using the new custom questionnaire;

Fifth step 1540 wherein the EMSSAP determines though a default setting or user input whether the response format should be automatically generated or not wherein it proceeds to either sixth step 1550 or eighth step 1570 respectively;

Sixth step 1550 wherein the EMSSAP selects the response format for the custom question and the process proceeds to seventh step 1560;

Seventh step 1560 wherein the EMSSAP determines whether the column title processed was the last one or not wherein it proceeds to fourth sub-process 1500D or third step 1520 respectively;

Eighth step 1570 wherein the user selects the response format for the custom question; and Ninth step 1580 wherein the user generates the custom response options for the custom question.

Accordingly, process flow 1500 allows the importation of data from a source where when column headings in the source do not match questions or columns within the database to which the source is being merged then the user generates a custom question for these titles and can create a custom questionnaire such that subsequently this new custom questionnaire may be employed to capture the data previously acquired and stored within the source. Optionally, the custom questionnaire may be solely relating to column headings within the source not matching those within the database or it may be that the new custom questions are added to an existing questionnaire. For clarity these options are not presented within process flow 1500 in FIG. 15.

Figure 16:
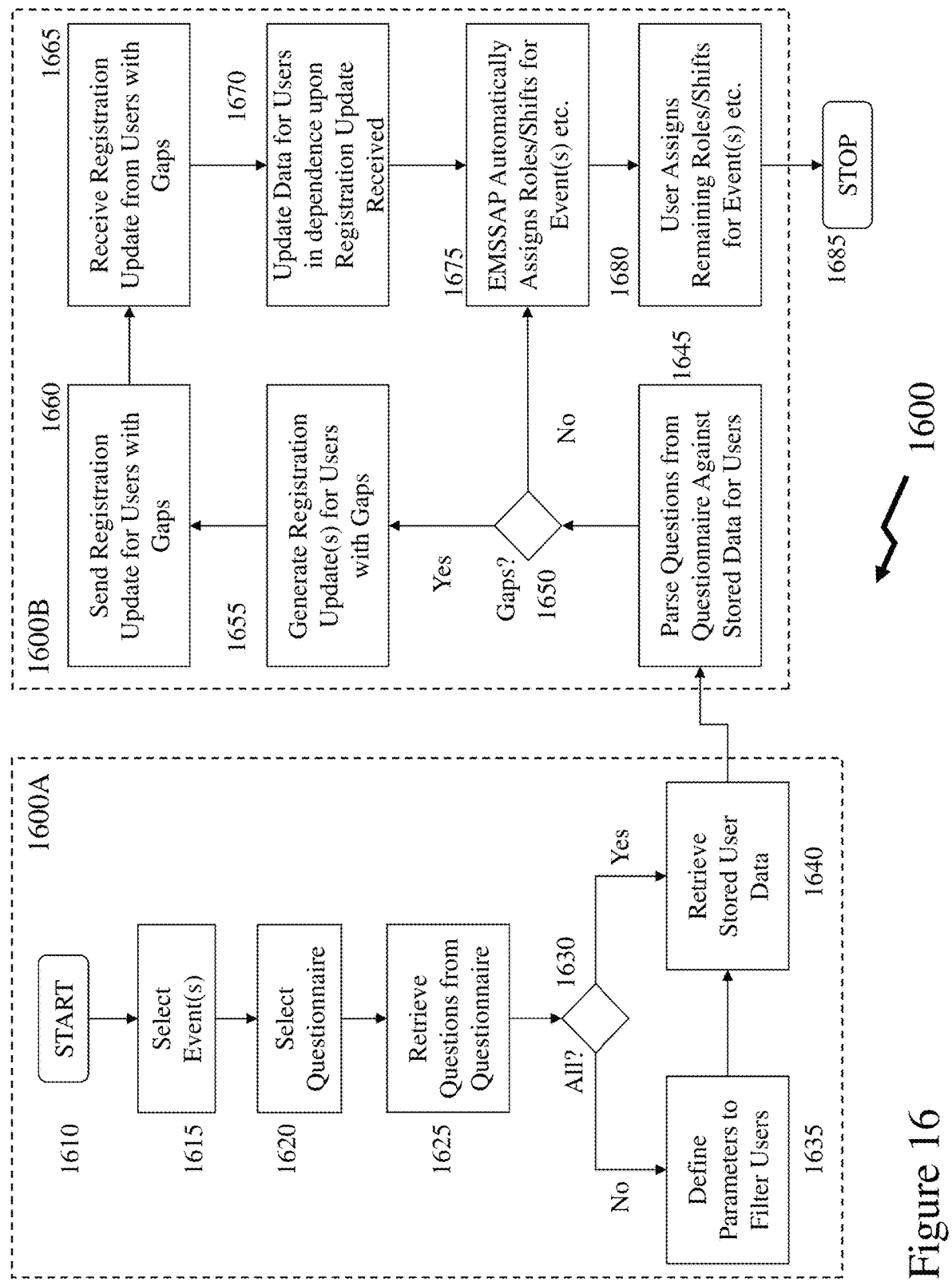
FIG. 16 depicts an exemplary process flow for an EMSSAP according to an embodiment of the invention relating to triggering registration information updates from registered users in dependence upon new custom questions generated subsequent to their registration.

Now referring to FIG. 16 there is depicted an exemplary process flow 1600 for an EMSSAP according to an embodiment of the invention relating to triggering registration information updates from registered users in dependence upon new custom questions generated subsequent to their registration. Accordingly, as depicted process flow 1600 comprises first and second sub-process flows 1600A and 1600B respectively. First sub-process flow 1600A comprising first to seventh steps 1610 to 1640 respectively, which are:

First step 1610 wherein the user initiates the process within an EMSSAP;

Second step 1615 wherein the user selects an event or events;

Third step 1620 wherein the user selects the questionnaire for the event or events;

Fourth step 1625 wherein the questions for the selected questionnaire are retrieved;

Fifth step 1630 wherein the EMSSAP wherein the user defines whether to apply the subsequent second sub-process flow 1600B to all users or just some users wherein the process proceeds to either seventh step 1640 or sixth step 1635 respectively;

Sixth step 1635 wherein the user selects one or more filters to apply to the users and proceeds to seventh step 1640; and Seventh step 1640 wherein the process flow 1600 retrieves the stored user data for either all users when it proceeds from fifth step 1630 directly or filtered users when it proceeds from sixth step 1635.

Second sub-process flow 1600B comprises eighth to fifteenth steps 1645 to 1675 respectively, these being:

Eighth step 1645 wherein the process flow 1600 parses the questions from the questionnaire against the stored data for the users;

Ninth step 1650 wherein the second sub-process flow 1600B determines whether there are gaps in the retrieved data or not and proceeds to either tenth step 1655 or fourteenth step 1675 respectively;

Tenth step 1655 wherein the second sub-process flow 1600B generates registration updates for the users with gaps;

Eleventh step 1660 wherein the second sub-process flow 1600B sends the generated registration updates to those users with gaps;

Twelfth step 1665 wherein the second sub-process flow 1600B receives the registration updates from the users with gaps;

Thirteenth step 1670 wherein the second sub-process flow 1600B updates the data for those users responding in dependence upon the registration update received;

Fourteenth step 1675 wherein the EMSSAP within the second sub-process flow 1600B assigns roles/shifts to the event(s) based upon the data; and Fifteenth step 1680 wherein the user then completes assignment of remaining roles/shifts where the EMSSAP cannot automatically assign these in fourteenth step 1675 before proceeding to stop in sixteenth step 1685.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
a first electronic device comprising a first microprocessor, a first memory for storing first executable instructions, and a first network interface for interfacing to a communications network, wherein the first executable instructions when executed by the first microprocessor configure the first electronic device to:
   access a database stored within a second memory accessible to the first electronic device, the database storing a plurality of default questionnaire responses and a plurality of custom questionnaire responses from a plurality of registrants where each registrant of the plurality of registrants generates a set of default questionnaire responses and a set of custom questionnaire responses in response to being presented a questionnaire comprising a plurality of default questions and a plurality of custom questions where the plurality of custom questions are specific to a discrete occurrence of an event to which the plurality of registrants were registering when providing the set of default questionnaire responses and a set of custom questionnaire responses;
   automatically determining with the first electronic device whether there are matched registrants by:
      parsing the plurality of default questionnaire responses associated for the plurality of registrants against a first identifier relating to a requirement associated with a role associated with the event and a second identifier relating to a shift associated with a role associated with the event to establish an initial list of registrants; and
      parsing the plurality of custom questionnaire responses associated with the initial list of registrants against a custom filter of a plurality of custom filters, the custom filter of the plurality of custom filters associated with a custom question of the plurality of custom questions to establish the matched registrants;
   upon determining either that there are no matched registrants or that there are remaining at least one of the role defined by the first identifier and the shift defined by the second identifier which have not been matched transmitting an electronic communication comprising data from the first electronic device to a second electronic device to render a graphical user interface (GUI) to a user of the second electronic device comprising the plurality of custom filters for use by the user of the second electronic device to filter the plurality of registrants to assign registrants to the remaining at least one of roles defined by the first identifier and the shift defined by the second identifier which have not been matched; and
   upon determining that there are matched registrants transmitting other electronic communications comprising other data from the first electronic device to electronic devices associated with the matched registrants; wherein
each custom filter of the plurality of custom filters has been automatically established by the first electronic device in dependence upon a custom question of the plurality of custom questions forming part of the questionnaire presented to each registrant of the plurality of registrants in response to which each registrant of the plurality of registrants generating their set of default questionnaire responses and set of custom questionnaire responses which are stored within the database;

second electronic device renders a graphical user interface (GUI) to a user of the second electronic device comprising the plurality of custom filters for use by the user of the second electronic device to filter the plurality of registrants to assign registrants to the remaining at least one of roles defined by the first identifier and the shift defined by the second identifier which have not been matched; and
each electronic device of the electronic devices associated with the matched registrants provides at least a visual indication to the matched registrant associated with that electronic device of the electronic devices associated with the matched registrants.

2. The system according to claim 1, wherein
each custom question of the plurality of custom questions was established by the first electronic device by:
   storing content received via the first network interface content from a third electronic device, the content comprising the custom question of the plurality of custom questions; and
   storing a format of answers to the custom question of the plurality of custom questions received from the third electronic device; and
each custom filter of the plurality of custom filters is automatically established in dependence upon the content of a predetermined custom question of the plurality of custom questions and the format of the predetermined custom question of the plurality of custom questions.

3. The system according to claim 1, wherein
each custom question of the plurality of custom questions was established by the first electronic device by:
   storing content received via the first network interface content from a third electronic device, the content comprising the custom question of the plurality of custom questions; and
   storing a format of answers to the custom question of the plurality of custom questions received from the third electronic device;
   automatically determining whether the format of the answer to the custom question of the plurality of custom questions is of a first type or a second type;
   upon determining that the format of the answer to the custom question of the plurality of custom questions is of the first type automatically generating a plurality of filter options which are stored in association with the custom question of the plurality of custom questions;
   upon determining that the format of the answer to the custom question of the plurality of custom questions is of the second type automatically generating a plurality of filter options which are stored in association with the custom question of the plurality of custom questions in dependence upon a plurality of response options stored within the database established from data received from the third electronic device when the custom question of the plurality of custom questions was generated by a user of the third electronic device;
each custom filter of the plurality of custom filters is automatically established in dependence upon the content of a predetermined custom question of the plurality of custom questions and the format of the predetermined custom question of the plurality of custom questions; and
each custom filter of the plurality of custom filters is applied by the first electronic device to generate a new list of registrants by applying a selected filter option of the plurality of filter options to either the plurality of registrants or the matched list of registrants for rendering within another GUI from which the user of the first electronic device assigns registrants within the new list of registrants to the remaining at least one of roles defined by the first identifier and the shift defined by the second identifier which have not been matched.

4. The system according to claim 1, wherein
each custom question of the plurality of custom questions was established by the first electronic device by:
   storing content received via the first network interface content from a third electronic device, the content comprising the custom question of the plurality of custom questions; and
   storing a format of answers to the custom question of the plurality of custom questions received from the third electronic device;
   automatically determining whether the format of the answer to the custom question of the plurality of custom questions is of a first type or a second type;
   upon determining that the format of the answer to the custom question of the plurality of custom questions is of the first type automatically generating a plurality of filter options which are stored in association with the custom question of the plurality of custom questions;
   upon determining that the format of the answer to the custom question of the plurality of custom questions is of the second type:
      storing a plurality of response options to the custom question of the plurality of custom questions received from the third electronic device; and
      automatically generating a plurality of filter options which are stored in association with the custom question of the plurality of custom questions in dependence upon the plurality of response options.

5. The system according to claim 1, wherein
each custom question of the plurality of custom questions was established by the first electronic device by:
   storing content received via the first network interface content from a third electronic device, the content comprising the custom question of the plurality of custom questions; and
   storing a format of answers to the custom question of the plurality of custom questions received from the third electronic device;
   automatically determining whether the format of the answer to the custom question of the plurality of custom questions is of a first type or a second type;
   upon determining that the format of the answer to the custom question of the plurality of custom questions is of the first type automatically generating a plurality of filter options which are stored in association with the custom question of the plurality of custom questions;
   upon determining that the format of the answer to the custom question of the plurality of custom questions is of the second type:
      storing a plurality of response options to the custom question of the plurality of custom questions received from the third electronic device; and
      automatically generating a plurality of filter options which are stored in association with the custom question of the plurality of custom questions in dependence upon the plurality of response options; and
   each custom filter of the plurality of custom filters associated with the custom question of the plurality of custom questions comprises a custom filter option of the plurality of custom filter options established by the first electronic device.

6. The system according to claim 1, wherein
each custom question of the plurality of custom questions was established by the first electronic device by:
   storing content received via the first network interface content from a third electronic device, the content comprising the custom question of the plurality of custom questions; and
   storing a format of answers to the custom question of the plurality of custom questions received from the third electronic device;
   automatically determining whether the format of the answer to the custom question of the plurality of custom questions is of a first type or a second type;
   upon determining that the format of the answer to the custom question of the plurality of custom questions is of the first type automatically generating a plurality of custom filter options which are defined by the format of the answer to the custom question of the plurality of custom questions and stored in association with the custom question of the plurality of custom questions;
   upon determining that the format of the answer to the custom question of the plurality of custom questions is of the second type:
      storing data received via the first network interface content from the third electronic device, the data comprising a set of default responses to be associated with the custom question of the plurality of custom questions; and
      automatically generating the plurality of custom filter options for the custom question of the plurality of custom questions in dependence upon the set of default responses.

7. The system according to claim 1, wherein
each custom question of the plurality of custom questions was established by the first electronic device by:
   storing content received via the first network interface content from a third electronic device, the content comprising the custom question of the plurality of custom questions; and
   storing a format of answers to the custom question of the plurality of custom questions received from the third electronic device;
   automatically determining whether the format of the answer to the custom question of the plurality of custom questions is of a first type or a second type;
   upon determining that the format of the answer to the custom question of the plurality of custom questions is of the first type automatically generating a plurality of custom filter options which are defined by the format of the answer to the custom question of the plurality of custom questions and stored in association with the custom question of the plurality of custom questions;
   upon determining that the format of the answer to the custom question of the plurality of custom questions is of the second type:
      storing data received via the first network interface content from the third electronic device, the data comprising a set of default responses to be associated with the custom question of the plurality of custom questions; and automatically generating the plurality of custom filter options for the custom question of the plurality of custom questions in dependence upon the set of default responses; and each custom filter of the plurality of custom filters associated with the custom question of the plurality of custom questions comprises a custom filter option of the plurality of custom filter options established by the first electronic device.

8. The system according to claim 1, wherein
each custom question of the plurality of custom questions was established by the first electronic device by:
storing content received via the first network interface content from a third electronic device, the content comprising the custom question of the plurality of custom questions; and
storing a format of answers to the custom question of the plurality of custom questions received from the third electronic device;
automatically determining whether the format of the answer to the custom question of the plurality of custom questions is of a first type or a second type;
upon determining that the format of the answer to the custom question of the plurality of custom questions is of the first type automatically generating a plurality of custom filter options which are defined by the format of the answer to the custom question of the plurality of custom questions and stored in association with the custom question of the plurality of custom questions;
upon determining that the format of the answer to the custom question of the plurality of custom questions is of the second type automatically generating the plurality of custom filter options for the custom question of the plurality of custom questions in dependence upon a set of default responses stored by the first electronic device received from the third electronic device.

9. The system according to claim 1, wherein
each custom question of the plurality of custom questions was established by the first electronic device by:
storing content received via the first network interface content from a third electronic device, the content comprising the custom question of the plurality of custom questions; and
storing a format of answers to the custom question of the plurality of custom questions received from the third electronic device;
automatically determining whether the format of the answer to the custom question of the plurality of custom questions is of a first type or a second type;
upon determining that the format of the answer to the custom question of the plurality of custom questions is of the first type automatically generating a plurality of custom filter options which are defined by the format of the answer to the custom question of the plurality of custom questions and stored in association with the custom question of the plurality of custom questions;
upon determining that the format of the answer to the custom question of the plurality of custom questions is of the second type automatically generating the plurality of custom filter options for the custom question of the plurality of custom questions in dependence upon a set of default responses stored by the first electronic device received from the third electronic device; and each custom filter of the plurality of custom filters associated with the custom question of the plurality of custom questions comprises a custom filter option of the plurality of custom filter options established by the first electronic device.

10. The system according to claim 3, wherein
the plurality of custom filters associated with the custom question of the plurality of custom questions were established by automatically determining whether a format of an answer to the custom question of the plurality of custom questions is of a first type or a second type;
upon determining that the format of the answer to the custom question of the plurality of custom questions is of the first type automatically generating a plurality of custom filter options which are defined by the format of the answer to the custom question of the plurality of custom questions and stored in association with the custom question of the plurality of custom questions;
upon determining that the format of the answer to the custom question of the plurality of custom questions is of the second type:
storing data received via the first network interface content from the third electronic device, the data comprising a set of default responses to be associated with the custom question of the plurality of custom questions; and
automatically generating the plurality of custom filter options for the custom question of the plurality of custom questions in dependence upon the set of default responses.

11. The system according to claim 3, wherein
the plurality of custom filters associated with the custom question of the plurality of custom questions were established by automatically determining whether a format of an answer to the custom question of the plurality of custom questions is of a first type or a second type;
upon determining that the format of the answer to the custom question of the plurality of custom questions is of the first type automatically generating a plurality of custom filter options which are defined by the format of the answer to the custom question of the plurality of custom questions and stored in association with the custom question of the plurality of custom questions;
upon determining that the format of the answer to the custom question of the plurality of custom questions is of the second type:
storing data received via the first network interface content from the third electronic device, the data comprising a set of default responses to be associated with the custom question of the plurality of custom questions; and
automatically generating the plurality of custom filter options for the custom question of the plurality of custom questions in dependence upon the set of default responses; and
each custom filter of the plurality of custom filters associated with the custom question of the plurality of custom questions comprises a custom filter option of the plurality of custom filter options established by the first electronic device.

12. The system according to claim 1, wherein
each custom question of the plurality of custom questions was established by the first electronic device by:
storing content received via the first network interface content from a third electronic device, the content comprising the custom question of the plurality of custom questions; and
storing a format of answers to the custom question of the plurality of custom questions received from the third electronic device;
storing content received via the first network interface content from a third electronic device, the content comprising a sub-question to the custom question of the plurality of custom questions; and
storing a format of answers to the sub-question of the custom question of the plurality of custom questions received from the third electronic device;
automatically determining whether the format of the answer to the custom question of the plurality of custom questions is of a first type or a second type;
upon determining that the format of the answer to the custom question of the plurality of custom questions is of the first type automatically generating a plurality of custom filter options which are defined by the format of the answer to the custom question of the plurality of custom questions and stored in association with the custom question of the plurality of custom questions;
upon determining that the format of the answer to the custom question of the plurality of custom questions is of the second type automatically generating the plurality of custom filter options for the custom question of the plurality of custom questions in dependence upon a set of default responses stored by the first electronic device received from the third electronic device;
automatically determining whether the format of the answer to the sub-question of the custom question of the plurality of custom questions is of a third type or a fourth type;
upon determining that the format of the answer to the sub-question of the custom question of the plurality of custom questions is of the third type automatically generating a plurality of further custom filter options which are defined by the format of the answer to the sub-question to the custom question of the plurality of custom questions and stored in association with the sub-question to the custom question of the plurality of custom questions;
upon determining that the format of the answer to the custom question of the plurality of custom questions is of the fourth type automatically generating the plurality of further custom filter options for the sub-question to the custom question of the plurality of custom questions in dependence upon a set of other default responses stored by the first electronic device received from the third electronic device.

13. The system according to claim 1, wherein
each custom question of the plurality of custom questions was established by the first electronic device by:
storing content received via the first network interface content from a third electronic device, the content comprising the custom question of the plurality of custom questions; and
storing a format of answers to the custom question of the plurality of custom questions received from the third electronic device;
storing content received via the first network interface content from a third electronic device, the content comprising a sub-question to the custom question of the plurality of custom questions; and
storing a format of answers to the sub-question of the custom question of the plurality of custom questions received from the third electronic device;
automatically determining whether the format of the answer to the custom question of the plurality of custom questions is of a first type or a second type;
upon determining that the format of the answer to the custom question of the plurality of custom questions is of the first type automatically generating a plurality of custom filter options which are defined by the format of the answer to the custom question of the plurality of custom questions and stored in association with the custom question of the plurality of custom questions;
upon determining that the format of the answer to the custom question of the plurality of custom questions is of the second type automatically generating the plurality of custom filter options for the custom question of the plurality of custom questions in dependence upon a set of default responses stored by the first electronic device received from the third electronic device;
automatically determining whether the format of the answer to the sub-question of the custom question of the plurality of custom questions is of a third type or a fourth type;
upon determining that the format of the answer to the sub-question of the custom question of the plurality of custom questions is of the third type automatically generating a plurality of further custom filter options which are defined by the format of the answer to the sub-question to the custom question of the plurality of custom questions and stored in association with the sub-question to the custom question of the plurality of custom questions;
upon determining that the format of the answer to the custom question of the plurality of custom questions is of the fourth type automatically generating the plurality of further custom filter options for the sub-question to the custom question of the plurality of custom questions in dependence upon a set of other default responses stored by the first electronic device received from the third electronic device; and
each custom filter of the plurality of custom filters associated with the custom question of the plurality of custom questions comprises a custom filter option of the plurality of custom filter options established by the first electronic device and a further custom filter option of the plurality of further custom filter options established by the first electronic device.

14. The system according to claim 1, wherein
the first executable instructions when executed by the first microprocessor further configure the first electronic device to:
transmit other data to the second electronic device to render a first GUI and a second GUI to the user of the second electronic device wherein:
the first GUI relates to adding a custom question to the questionnaire, the first GUI comprising;
a first field for the user to enter text for the custom question; and a menu comprising a set of selectable items, each item of the set of selectable items being a format for an answer to the custom question; and the second GUI relates to one or more responses where the one or more responses are established in dependence upon a selected item of the set of selectable items within the menu; wherein for a first subset of the items of the set of selectable items the one or more responses are pre-defined; and for a second subset of the items of the set of selectable items the one or more responses is a free format text entry field of predetermined length;

for a third subset of the items of the set of selectable items the plurality of responses the one or more responses is a field for another user to upload an item of electronic content.

15. The system according to claim 1, wherein
the first executable instructions when executed by the first microprocessor further configure the first electronic device to:
update the database by a process comprising:
access stored data within the database;
parse the headers of the stored data against the questionnaire;
determine whether column data header associated with the questionnaire matches a column header in the stored data;
upon determining that the column data header associated with the questionnaire matches a column header in the stored data storing the column data associated with that column data header within the database;
upon determining that the column data header associated with the questionnaire does not match a column header in the stored data executing another process comprising:
automatically creating a custom column within the database;
automatically creating a custom filter for the custom column for use by the user in filtering; and
storing the column data associated with that column data header within the database.

16. The system according to claim 1, wherein
the first executable instructions when executed by the first microprocessor further configure the first electronic device to import stored data identified by a user of a second electronic into the database.

17. The system according to claim 16, wherein
importing the stored data into the database comprises:
access the stored data;
parse the headers of the stored data against the questionnaire;
determine whether each column data header associated with the stored data matches a column header in the database;
upon determining that the column data header associated with the stored data matches a column header in the database storing the column data associated with that column data header within the database;
upon determining that the column data header associated with the stored data does not match a column header in the database executing another process comprising:
automatically creating a custom column within the database;

establishing a custom filter for the custom column for use by the user in filtering; and
storing the column data associated with that column data header within the database.

18. The system according to claim 16, further comprising:
generating a custom questionnaire from the data imported; wherein
importing the stored data into the database comprises:
accessing stored data within the database and parsing the headers of the stored data against the questionnaire;
determining whether each column data header of the stored data matches a column header in the stored data;
upon determining that the column data header associated with the stored data matches a column header in the database storing the column data associated with that column data header within the database;
upon determining that the column data header associated with the stored data does not match a column header in the database executing another process comprising:
automatically creating a custom column within the database; and
storing the column data associated with that column data header within the database;
the custom questionnaire solely relates to those column data headers associated with the stored data does not match a column header in the stored data; and
the custom questionnaire comprises custom questions generated by a user of the second electronic device upon the user being presented with the column data headers that do not match column header data in the stored data.

19. The system according to claim 16, further comprising:
generating a custom questionnaire from the data imported; wherein
importing the stored data into the database comprises:
accessing stored data within the database and parsing the headers of the stored data against the questionnaire;
determining whether each column data header of the stored data matches a column header in the stored data;
upon determining that the column data header associated with the stored data matches a column header in the database storing the column data associated with that column data header within the database;
upon determining that the column data header associated with the stored data does not match a column header in the database executing another process comprising:
automatically creating a custom column within the database; and
storing the column data associated with that column data header within the database;
the custom questionnaire comprises the questionnaire with new custom questions; and
the new custom questions are generated by a user of the second electronic device upon the user being presented with the column data headers that do not match column header data in the stored data.

20. The system according to claim 16, further comprising
generating a custom questionnaire from the data imported;
determining whether the data within the database for a registrant of the plurality of registrants comprises one or more gaps;

transmitting to the registrant of the plurality of registrants a registration update for completion by the registrant of the plurality of registrants; wherein
importing the stored data into the database comprises:
   accessing stored data within the database and parsing the headers of the stored data against the questionnaire;
   determining whether each column data header of the stored data matches a column header in the stored data;
   upon determining that the column data header associated with the stored data matches a column header in the database storing the column data associated with that column data header within the database;
   upon determining that the column data header associated with the stored data does not match a column header in the database executing another process comprising:
     automatically creating a custom column within the database; and
     storing the column data associated with that column data header within the database;
the custom questionnaire comprises either the questionnaire with new custom questions or solely the new custom questions; and
the new custom questions are generated by a user of the second electronic device upon the user being presented with the column data headers that do not match column header data in the stored data.

\* \* \* \* \*